(12) United States Patent
Poltorak

(10) Patent No.: US 11,794,879 B2
(45) Date of Patent: Oct. 24, 2023

(54) APPARATUS AND METHOD FOR BALANCING AIRCRAFT WITH ROBOTIC ARMS

(71) Applicant: Alexander I. Poltorak, Suffern, NY (US)

(72) Inventor: Alexander I. Poltorak, Monsey, NY (US)

( * ) Notice: Subject to any disclaimer, the term of this patent is extended or adjusted under 35 U.S.C. 154(b) by 182 days.

(21) Appl. No.: 17/515,231

(22) Filed: Oct. 29, 2021

(65) Prior Publication Data

US 2022/0119096 A1 Apr. 21, 2022

Related U.S. Application Data

(62) Division of application No. 16/336,904, filed as application No. PCT/US2017/056216 on Oct. 11, 2017, now Pat. No. 11,453,480.

(Continued)

(51) Int. Cl.

| | |
|---|---|
| *B64C 17/02* | (2006.01) |
| *B64C 27/08* | (2023.01) |
| *B64C 39/02* | (2023.01) |
| *B60W 20/10* | (2016.01) |
| *B64C 27/04* | (2006.01) |
| *B64U 10/10* | (2023.01) |
| *B64U 10/13* | (2023.01) |

(Continued)

(52) U.S. Cl.
CPC ............ *B64C 17/02* (2013.01); *B60W 20/10* (2013.01); *B64C 27/04* (2013.01); *B64C 27/08* (2013.01); *B64C 39/024* (2013.01); *B64U 10/10* (2023.01); *B64U 10/13* (2023.01); *B64U 30/20* (2023.01); *B64U 50/13* (2023.01); *B64U 50/19* (2023.01); *B64U 2101/60* (2023.01)

(58) Field of Classification Search
CPC ......... B64C 17/02; B64C 27/04; B64C 27/08; B64C 39/024; B60W 20/10; B64U 10/10; B64U 10/13; B64U 30/20; B64U 50/13; B64U 50/19; B64U 2101/60; B64D 1/22
See application file for complete search history.

(56) References Cited

U.S. PATENT DOCUMENTS 5,444,612 A * 8/1995 Torii .................... G05B 19/19
 700/29
6,431,019 B1 * 8/2002 Greene ................... B25J 9/104
 89/1.1

(Continued)

*Primary Examiner* — Medhat Badawi
(74) *Attorney, Agent, or Firm* — Anatoly S. Weiser; IPLCounsel.com

(57) ABSTRACT

A hover-capable flying machine such as a drone includes a robotic arm extending from the body, and an instrumentality for balancing the machine in response to disturbances such as those caused by picking up and dropping of the payload by the extended robotic arm. In embodiments, the end of the arm is equipped with a balancing rotor assembly that may provide lift sufficient to counteract the weight of the payload and/or of the arm. In embodiments, the machine's power pack is shifted in response to the disturbances. The power pack may be moved, for example, on a rail within and/or extending beyond the machine in a direction generally opposite to the extended arm. The power pack may also be built into a bandolier-like device that can be rolled-in and rolled out, thus changing the center of gravity of the machine.

22 Claims, 29 Drawing Sheets

Related U.S. Application Data

(60) Provisional application No. 62/407,971, filed on Oct. 13, 2016.

(51) Int. Cl.
*B64U 30/20* (2023.01)
*B64U 50/13* (2023.01)
*B64U 50/19* (2023.01)
*B64U 101/60* (2023.01)

(56) References Cited

U.S. PATENT DOCUMENTS

| | | | | |
|---|---|---|---|---|
| 6,588,701 | B2 * | 7/2003 | Yavnai | B62D 57/02 244/23 B |
| 7,152,456 | B2 * | 12/2006 | Eaton | G01B 5/004 73/1.79 |
| 7,525,276 | B2 * | 4/2009 | Eaton | B25J 5/007 318/587 |
| 7,536,931 | B2 * | 5/2009 | Saito | B25J 18/06 901/28 |
| 7,802,755 | B2 * | 9/2010 | Poltorak | B64C 27/10 244/17.27 |
| 7,805,218 | B2 * | 9/2010 | Nagasaka | B62D 57/032 318/568.22 |
| 8,621,953 | B2 * | 1/2014 | Hornbach | B25J 17/0275 74/490.01 |
| 9,393,000 | B2 * | 7/2016 | Donhowe | A61B 34/30 |
| 9,878,786 | B2 * | 1/2018 | Chan | B64D 27/26 |
| 9,902,491 | B2 * | 2/2018 | Chan | B64C 39/024 |
| 9,919,797 | B2 * | 3/2018 | Chan | B64C 27/52 |
| 9,975,633 | B1 * | 5/2018 | Johnson | B64C 7/02 |
| 10,012,999 | B2 * | 7/2018 | Chandra | B64C 39/024 |
| 10,029,803 | B1 * | 7/2018 | Larsen | B64C 39/024 |
| 10,189,565 | B2 * | 1/2019 | Patterson | B64C 39/024 |
| 10,196,143 | B2 * | 2/2019 | Quinlan | B64U 70/20 |
| 10,279,898 | B2 * | 5/2019 | Green | B64C 27/32 |
| 10,287,006 | B1 * | 5/2019 | Beckman | B64C 27/39 |
| 10,752,334 | B2 * | 8/2020 | Chow | B64C 1/30 |
| 11,167,843 | B1 * | 11/2021 | Kim | B64C 39/024 |
| 11,242,147 | B2 * | 2/2022 | Zvara | B64D 1/08 |
| 2009/0050750 | A1 * | 2/2009 | Goossen | B64C 39/024 901/14 |
| 2010/0224720 | A1 * | 9/2010 | Roesch | B64C 27/26 244/12.3 |
| 2011/0084162 | A1 * | 4/2011 | Goossen | B64D 1/22 244/135 C |
| 2013/0206915 | A1 * | 8/2013 | Desaulniers | B64C 29/00 244/165 |
| 2014/0091172 | A1 * | 4/2014 | Ariton | B64C 27/605 244/17.23 |
| 2016/0144954 | A1 * | 5/2016 | Daigle | B64C 39/024 244/17.23 |
| 2016/0159471 | A1 * | 6/2016 | Chan | B64D 47/08 244/39 |
| 2016/0159472 | A1 * | 6/2016 | Chan | B64C 39/024 244/39 |
| 2016/0272310 | A1 * | 9/2016 | Chan | B64C 27/37 |
| 2016/0280359 | A1 * | 9/2016 | Semke | B64C 25/32 |
| 2016/0304199 | A1 * | 10/2016 | Chan | B64C 27/52 |
| 2017/0174317 | A1 * | 6/2017 | Beckman | G05D 1/101 |
| 2017/0210470 | A1 * | 7/2017 | Pardell | H02S 40/10 |
| 2017/0274982 | A1 * | 9/2017 | Beckman | B64C 11/30 |
| 2017/0274988 | A1 * | 9/2017 | Nguyen | B64C 25/28 |
| 2017/0274993 | A1 * | 9/2017 | Beckman | B64C 3/46 |
| 2017/0334561 | A1 * | 11/2017 | Sopper | B66D 5/026 |
| 2017/0369166 | A1 * | 12/2017 | van den Heuvel | B64C 39/022 |
| 2017/0373621 | A1 * | 12/2017 | Kessler | H02P 6/30 |
| 2018/0101169 | A1 * | 4/2018 | Applewhite | G08G 5/00 |
| 2018/0118334 | A1 * | 5/2018 | Stamps | B64C 27/605 |
| 2018/0118336 | A1 * | 5/2018 | Drennan | B64C 37/02 |
| 2018/0244377 | A1 * | 8/2018 | Chan | B64C 39/024 |
| 2018/0327090 | A1 * | 11/2018 | De Chassey | B64C 39/024 |
| 2019/0179344 | A1 * | 6/2019 | Qu | B64C 39/024 |
| 2019/0210724 | A1 * | 7/2019 | Bublitsky | B64U 10/25 |
| 2019/0276140 | A1 * | 9/2019 | Poltorak | B64C 39/024 |
| 2020/0361601 | A1 * | 11/2020 | Mikic | B64C 27/52 |

* cited by examiner

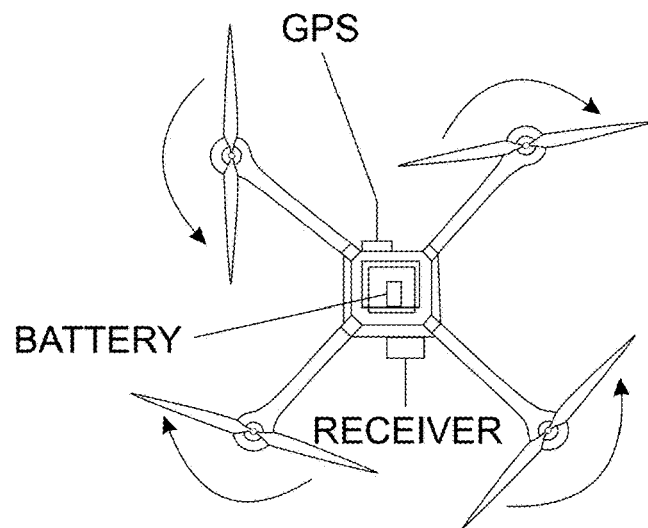
Figure 1B I
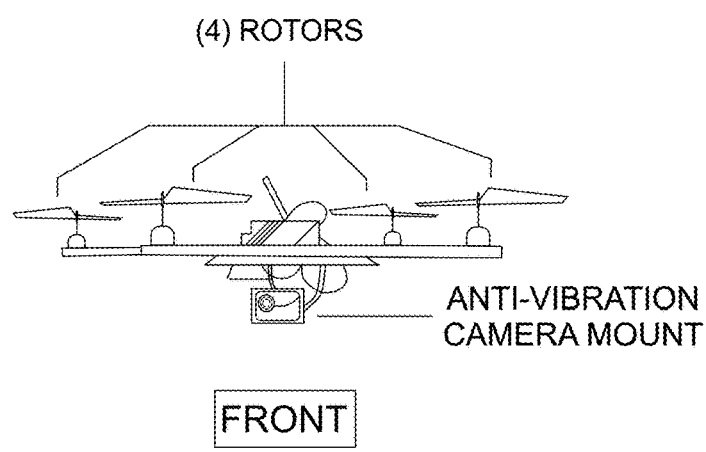
Figure 1B II

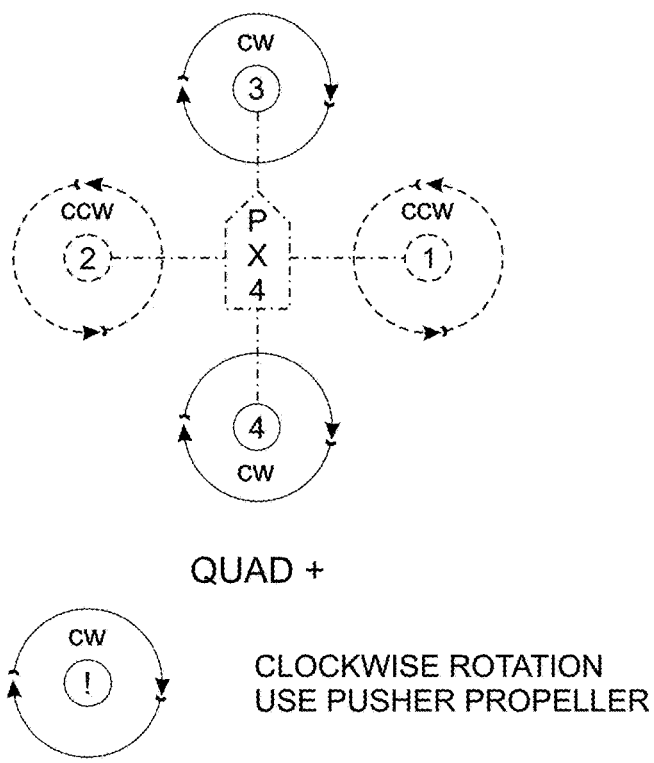
QUAD +
CLOCKWISE ROTATION
USE PUSHER PROPELLER
Figure 1C I
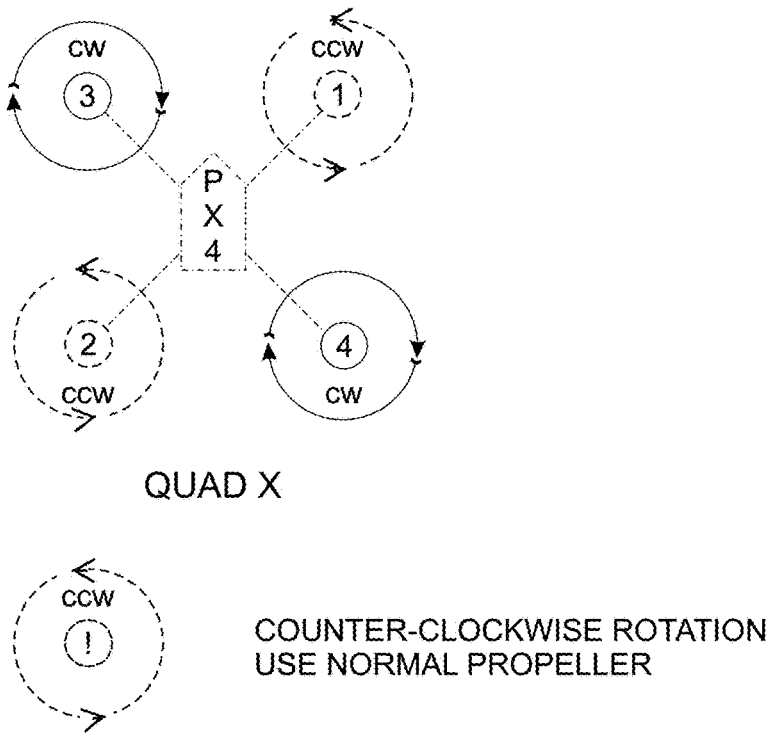
QUAD X
COUNTER-CLOCKWISE ROTATION
USE NORMAL PROPELLER
Figure 1C II

QUAD H

COUNTER-CLOCKWISE ROTATION
USE NORMAL PROPELLER

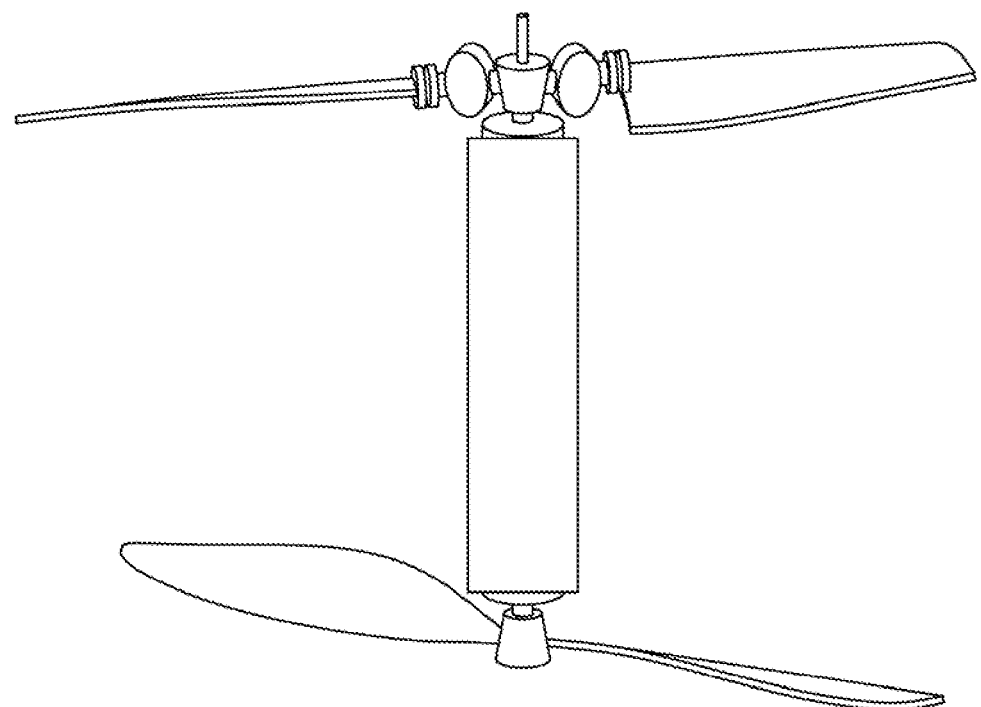
FIGURE 1H1

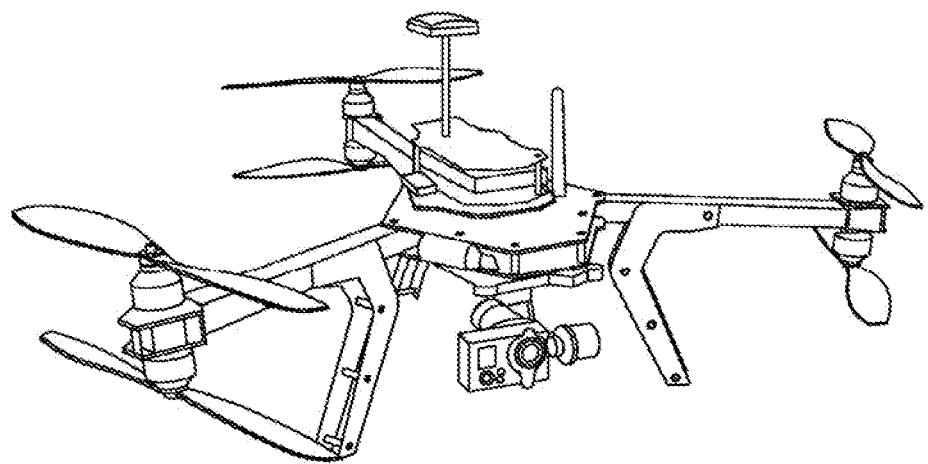
FIGURE 1H2

APPARATUS AND METHOD FOR BALANCING AIRCRAFT WITH ROBOTIC ARMS

CROSS-REFERENCE TO RELATED APPLICATIONS

This patent application is a division of and claims priority from U.S. application Ser. No. 16/336,904, entitled APPARATUS AND METHOD FOR BALANCING AIRCRAFT WITH ROBOTIC ARMS, filed on 26 Mar. 2019; which is the national stage entry of PCT International Application PCT/US17/56216, WIPO publication WO2018/071592, entitled APPARATUS AND METHOD FOR BALANCING AIRCRAFT WITH ROBOTIC ARMS, filed on 11 Oct. 2017; which claims priority from U.S. provisional patent application Ser. No. 62/407,971, entitled APPARATUS AND METHOD FOR BALANCING AIRCRAFT WITH ROBOTIC ARMS AND PAYLOADS, filed on 13 Oct. 2016. Each of the patent documents identified above is hereby incorporated by reference in its entirety as if fully set forth herein, including text, figures, claims, tables, and computer program listing appendices (if present), and all other matter therein.

FIELD

The present description generally relates to stabilization and balancing of aircraft with robotic arms used for lifting, carrying, and/or dropping various payloads. In selected embodiments, the present description relates to drones with robotic arms and other aircraft capable of hovering.

BACKGROUND

Unmanned Aerial Vehicles (UAVs), also known as Unmanned Aerial Systems (UASs). Unmanned-Aircraft Vehicle Systems (UAVSs), Remotely Piloted Aerial Vehicles (RPAVs), Remotely Piloted Aircraft Systems (RPASs), and more commonly, as drones, are powered aerial vehicles (i.e., aircraft) that do not carry a pilot or human operator on board, can fly autonomously or be piloted remotely, and can carry payloads. Drones are presently used for intelligence gathering (e.g., through aerial photography), as missile delivery systems in military and intelligence operation, and for recreation by consumers. Drones can be employed for payload deliveries and pickups, among many other tasks. Drones are particularly useful for missions that are dangerous, monotonous, or otherwise impractical or unpleasant for a pilot, but can also be more cost-efficient than human-operated aircraft even for more agreeable missions.

There are generally three modes of drone operation: (1) autonomous operation by an onboard flight controller; (2) autonomous operation by a remote flight controller via remote control; (3) remote operation by a human operator, that is, operation by a human via remote control. It is, of course, possible to have a drone capable of some mixture of two or more of the modes described above. For example, different modes may be engaged at different times, and/or for different functions or tasks; and different modes may be engaged at the same time to control different functions and capabilities.

Drones are usually multirotor aircrafts. One of the most popular drone designs is a quadcopter (or quadrotor/quadrotor/quadrone) design—a drone design with four equally-spaced, high-speed rotors. Multirotor and other drones may be equipped with sensors to get information about their surroundings and their states (such as attitude and velocity). Such sensors may include 3D gyro, accelerometer, magnetometer, pressor sensor, GPS, camera, battery level sensor, radio control receiver, and others. Multirotor drones are typically controlled through radio remote controllers.

Rotors may be powered by electrical motors, for example, brushless DC motors.

Military and industrial UAVs are often powered by combustion engines requiring fuel. Some UAVs use solar power. Most consumer drones, however, operate on batteries. Currently, the most popular source of energy in consumer drones appears to be Lithium-Polymer (LiPo) batteries. Nickle Cadmium (NiCad) and Nickle Metal Hydride (NiMH) were first used, but Lithium batteries (Lithium Ion or LiPo) are generally superior to NiCad batteries because they typically have higher power densities, higher energy storage densities, and have longer lives. Lithium-ion (Li-ion), lithium iron phosphate (LiFePO4), lithium polymer, and lithium titanate batteries are also used in drone applications.

Some drones use charging stations to recharge.

Batteries are made of cell(s), from one to several, which may be connected in series and/or in parallel. If two similar cells are connected in series (positive to negative), the voltage will double, but current capacity will stay the same. Connecting two similar cells in parallel (positive to positive and negative to negative) doubles current capacity, but voltage will stay the same. Thus, it is possible to combine two or more batteries in parallel to multiply the total energy and current capacity; and it is also possible to combine two or more batteries in series to multiply the energy and output voltage.

To prolong the flight time, larger batteries are required. However, larger batteries (e.g., with more battery cells) increase the weight of the aircraft, requiring more power.

A quadrone (a.k.a. quadrotor) is a particularly popular drone having four rotors. Examples of quadrones are illustrated in FIGS. 1A and 1B.

Quadrones may have several body (frame) configurations supporting the four rotors, examples of which are illustrated in FIG. 1C.

Another frame configuration is Quad H, an example of which is illustrated in FIG. 1D.

The four rotors of a quadcopter may be made up of two pairs of rotors. One pair of oppositely-located rotors may rotate clockwise. The other pair of oppositely-located rotors may rotate counterclockwise. The angular momenta generated by the two sets of rotors cancel out so that the quadcopter does not pivot or yaw. This concept is illustrated in FIGS. 1E and 1F.

Other multirotors may have more than two such pairs of rotors, for example, totaling six, eight, or even more rotors.

Alternatively, two coaxial counter-rotating rotors may be placed one on top and the other on the bottom.

The so-called X8 (a.k.a. an octocopter or octorotor) configuration is similar to a quadrotor configuration but has two rotors per arm. Octorotors may have all eight rotors arranged in a disc.

Examples of various quadrotor, hexrotor, and octorotor configurations are illustrated in FIG. 1G.

As has already been mentioned, another configuration uses two coaxial counter-rotating rotors instead of one—one rotor on top and another counterrotating rotor on the bottom or vice versa. This allows almost double the lift force with only 10-20% loss of efficiency because the bottom rotor operates in a wash from the top rotor. This double-rotor assembly is typically used in Hex Y, Hex IV, and Oct X configurations. Examples are illustrated in FIG. 1H1 and FIG. 1H2.

To describe the orientation of an aircraft, three angles are used: roll, pitch, and yaw, as is illustrated in FIGS. 1I and 1J.

The roll angle of an aircraft describes how the aircraft is tilted side to side. Rolling any multirotor causes it to move sideways.

The pitch angle of an aircraft describes how the aircraft is tilted forward or backward. Pitching the multirotor causes it to move forward or backward.

The yaw angle of an aircraft describes its bearing, or, in other words, rotation of the craft as it stays level to the ground.

In a rotorcraft (e.g., a multirotor), lift is produced by the rotors. Total lift is equal to the sum of the lift produced by each of the rotors. To increase the altitude of a quadcopter, for example, the RPM of all four rotors may be increased and, to decrease the altitude of the quadcopter, the RPM of all four rotors may be decreased. If the force of gravity equals the force of the lift produced by the rotors, the multirotor should maintain a constant altitude (assuming its velocity vector has no vertical component).

By adjusting the relative speeds of the motors in just the right ways, keeping in mind that the rotational speed of the motors determines how much lift each rotor produces, the flight controller of a multirotor may cause the multirotor to rotate around any of the directional axes (roll, pitch, and yaw), or make the multirotor gain or lose altitude.

Pitch controls whether the quadcopter flies forward or backward. To pitch the front of the quadcopter (nose) down and the rear up, which results in a forward moment, the RPM of the rear rotors may be increased, and/or RPM of the front rotors may be decreased. To pitch aft the aircraft, the RPM of the front rotors may be increased, and/or the RPM of the rear rotors may be decreased, causing the quadcopter to move backward.

To roll the quadcopter along the longitudinal axes, the RPM of the rotors on one side may be increased and/or RPM of the rotors on the other side may be decreased.

Increasing or decreasing RPM on the opposite rotors increases the angular momentum, causing the quadcopter to yaw.

Flight controller or flight control system (FCS) is an onboard computer that coordinates all rotors to stabilize the flight of the multirotor aircraft. There are FCSs capable of making 600 or more adjustments per second.

Aircraft often carry payloads. Airplanes may carry payloads in their fuselages, and drones typically carry payloads underneath their fuselages.

Every aircraft generally must carry fuel or batteries (a.k.a. power pack or energy bank) that power the aircraft. The fuel may be gasoline or a similar fuel for internal combustion engines, or kerosene or other fuel for jet engines. Electric motors have lately been commonly used for propulsion of drones. Batteries are needed to power such electric motors. Attaching batteries (or a fuel tank) rigidly to the fuselage of an aircraft increases the weight and further reduces the aircraft's maneuverability.

Drones with one or more robotic "arms" adapted for handling various tasks can be particularly useful. A robotic arm is a mechanical arm or manipulator that may be programmable and may be operated autonomously by a CPU or by a remote operator. The links of such arm may be connected by joints, allowing rotational motion and translational (linear) displacement. The links of the manipulator may be considered to form a kinematic chain. The terminus of the kinematic chain of the manipulator is called the end effector. There are different types of robotic arms.

Cartesian robots are used for picking up and placing objects, assembly operations, and similar tasks. Arms in such robots may have three prismatic joints, whose axes are coincident with a Cartesian coordinator.

Cylindrical robots are used for assembly operations, handling of machine tools, spot welding, and handling in die-casting machines. Cylindrical robot arm axes form a cylindrical coordinate system, as is illustrated in FIG. 1K.

Spherical robots are used for handling machine tools, spot welding, and other tasks. Such robots have two rotary joints and one prismatic joint, i.e., two rotary axes and one linear axis. Spherical robots have arms forming a spherical coordinate system.

Selective Compliance Assembly Robot Arm (also known as Selective Compliance Articulated Robot Arm or SCARA) robots are used for picking up and placing objects, assembly operations, and handling of machine tools. Such robots feature two parallel rotary joints to provide compliance in a plane; this notion is illustrated in FIG. 1L.

Articulated robots are used for assembly operations, die-casting, fettling machines, gas welding, arc welding, and spray painting, among other applications. An articulated robotic arm has at least three rotary joints.

A parallel robot is a robot whose multiple arms support a platform and have prismatic or rotary joints.

In an anthropomorphic robot, a robotic hand resembles a human hand. i.e., a device with independently-operable fingers/thumb.

One type of tasks performed by drones with robotic arms is using the arms for picking up, carrying, and dropping off objects. Drones designed for such tasks may be hovering drones. The drop-offs and pickups may be to/from places that are not accessible vertically, that is, places not accessible from directly above with sufficient room for the drone to operate. Typically, one arm is positioned directly underneath the center of the drone, so that the arm itself and, especially, the payload, does not shift the center of gravity and tilt the drone. In some applications, two arms may be desirable for lifting, caring, and delivering certain types of payloads. When one or two robotic arms extend horizontally from a drone (and even more so when these arms lift and carry payloads), the center of gravity moves and may cause the aircraft to lose its balance. Another type of the tasks is when force with a vertical component needs to be applied to an object external to the drone. For example, an attempt to lift a payload by a robotic arm(s) in front of the drone may tilt the front of the drone down, which is undesirable. Performing such tasks by a robotic arm may unbalance the drone. Pitching the front of the drone down would result in a forward motion of the drone, as the lift of the drone's rotor(s) acquires a horizontal component. Moreover, the vertical component of the lift would diminish (as part of the energy is converted to horizontal motion), and the drone would lose altitude.

The problem of maintaining balance and attitude in the course of performing the balance-altering tasks is also present in hover-capable flying machines that are operated by human onboard pilots.

Therefore, it is desirable to provide improved techniques and designs for balancing flying machines.

SUMMARY

A need exists in the art for improved methods for maintaining balance in flying machines while lifting, carrying, or manipulating payloads, and in other similar circumstances, and for flying machines with improved balancing capabilities. A further need in the art exists for improved methods for maintaining balance in hover-capable flying machines (such as helicopters and drones), and for hover-capable flying machines with improved balancing capabilities. Yet another need in the art exists for improved methods for maintaining/controlling balance and attitude in hover-capable flying machines with robotic arms, and for hover-capable flying machines with robotic arms and improved balancing capabilities. Still another need in the art exists for improving techniques of carrying fuel or electrical batteries in a flying machine, and for flying machines with dynamic distribution of weight, particularly the weight of fuel or electrical batteries powering the flying machine.

Embodiments disclosed in this document are directed to apparatus and methods that satisfy one or more of these and/or other needs.

In accordance with one embodiment of the present invention, a flying machine capable of hovering includes a body (frame); at least one robotic arm extending from the body, the robotic arm terminating in an end effector; one or more main rotor assemblies; and a balancing rotor assembly located substantially above the end effector to provide lift compensating for weight of the payload carried by the end effector.

In accordance with another embodiment of the present invention, a flying machine capable of hovering includes a body; at least one robotic arm extending from the body, the robotic arm terminating in an end effector; one or more main rotor assemblies; a power pack; and means for moving the power pack in relation to the body and balancing the hover-capable machine in response to changes in payload carried by the end effector.

In accordance with another embodiment of the present invention, a flying machine capable of hovering includes a body, a power pack external to the body and dynamically positioned with respect to the body to help maintain the balance of the flying machine. The power pack may be a battery or a plurality of battery cells connected in parallel or sequentially.

In accordance with another embodiment of the present invention, a flying machine capable of hovering includes a body, a power pack external to the body and dynamically positioned with respect to the body to help maintain the balance of the aircraft.

In accordance with another embodiment, a flying machine capable of hovering includes a body; at least one energy bank, said at least one energy bank being one of a battery pack and a fuel tank; a robotic arm extending from the body, the robotic arm comprising a plurality of links, one or more joints, and an effector, the links of the plurality of links being connected by the one or more joints, the robotic arm ending in the effector; one or more main rotor assemblies supported by the body and operatively connected to said at least one energy bank; a landing gear; and a balancing rotor assembly located substantially above the effector to provide lift compensating for weight of payload carried by the effector.

In accordance with another embodiment, a flying machine capable of hovering includes a body; at least one robotic arm extending from the body, said at least one robotic arm comprising an effector, said at least one robotic arm ending in the effector; one or more main rotor assemblies; an extendable tail positioned on the opposite side of the body with respect to said at least one robotic arm; a power pack stored substantially at the end of the extendable tail; a motor for moving the power pack in relation to the body by regulating length of the extendable tail; and a controller linked to the motor, wherein the controller is configured to maintain the center of mass of the flying machine in response to changes in payload carried by the effector. In aspects, the extendable tail is a telescopic tail. In aspects, the extendable tail is an accordion tail.

In accordance with another embodiment, a flying machine capable of hovering includes a body; at least one robotic arm extending from the body, said at least one robotic arm comprising an end effector, said at least one robotic arm terminating in the end effector; one or more main rotor assemblies; a flexible tail positioned on the opposite side of the body with respect to said at least one robotic arm; a plurality of linked battery cells spaced parallel to each other throughout the tail; a motor for regulating length of the tail in relation to the body by rolling up and unrolling out the tail; and a controller linked to the motor, wherein the controller is configured to maintain the center of mass of the flying machine in response to changes in payload carried by the end effector.

These and other features and aspects of the present invention or inventions will be better understood with reference to the following description, drawings, and appended claims.

BRIEF DESCRIPTION OF THE FIGURES

FIGS. 1A through 1L illustrate various hover-capable flying machines, their configurations, and associated concepts:

DETAILED DESCRIPTION

Figure 1A:
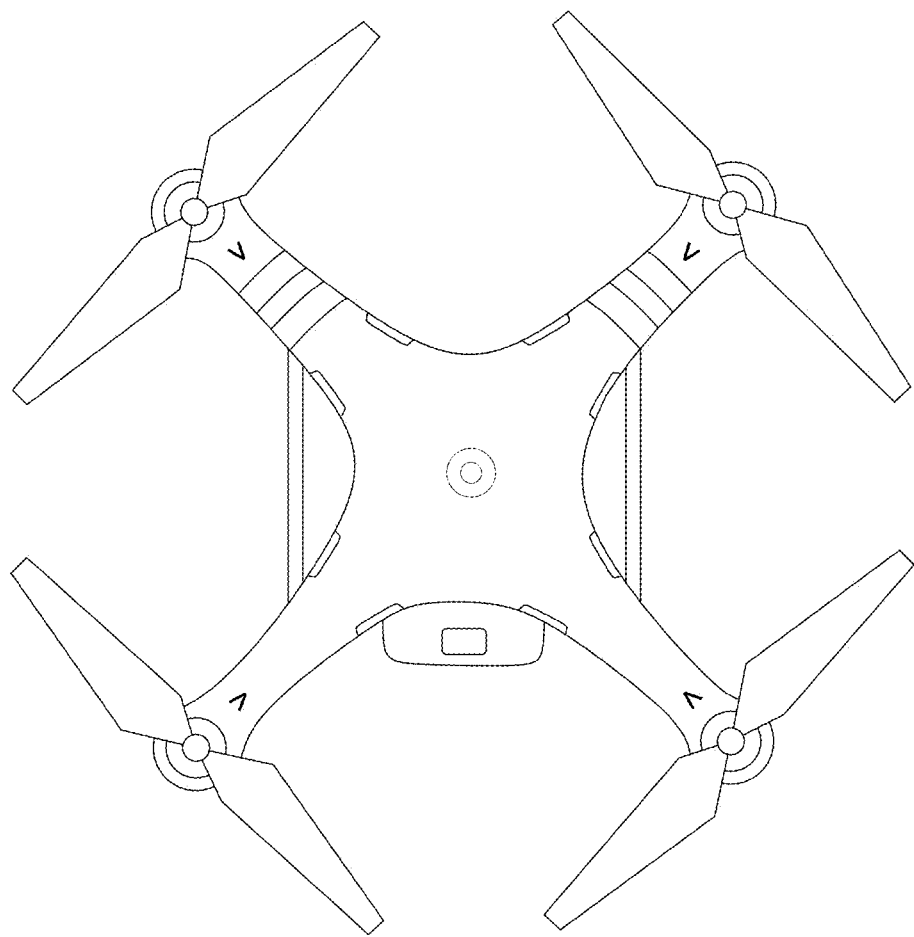
Figure 1D:
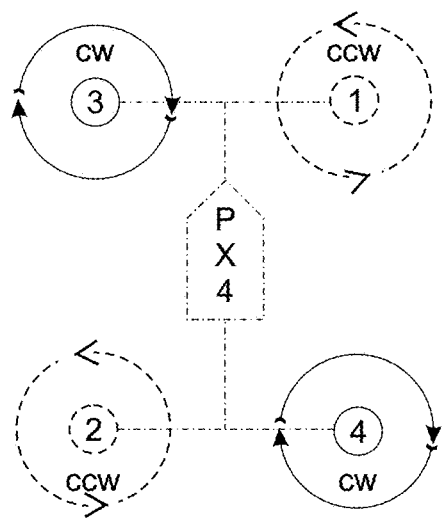
Figure 1D:
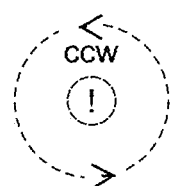
Figure 1E:
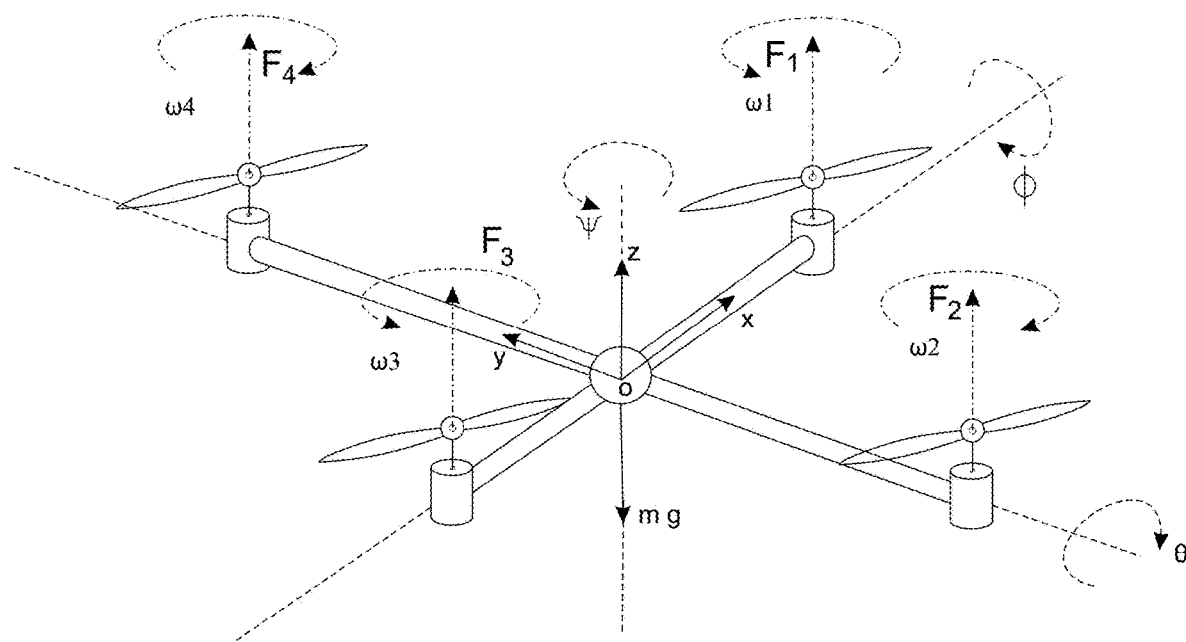
Figure 1F:
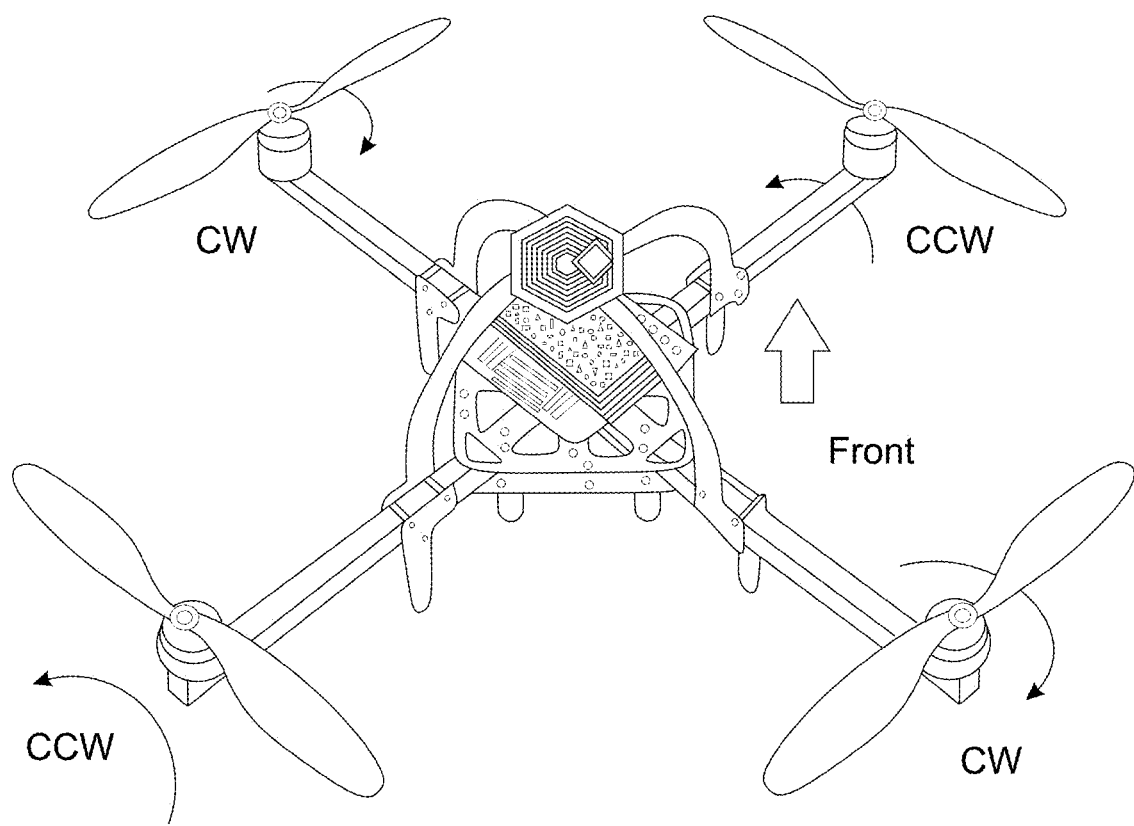
Figure 1G:
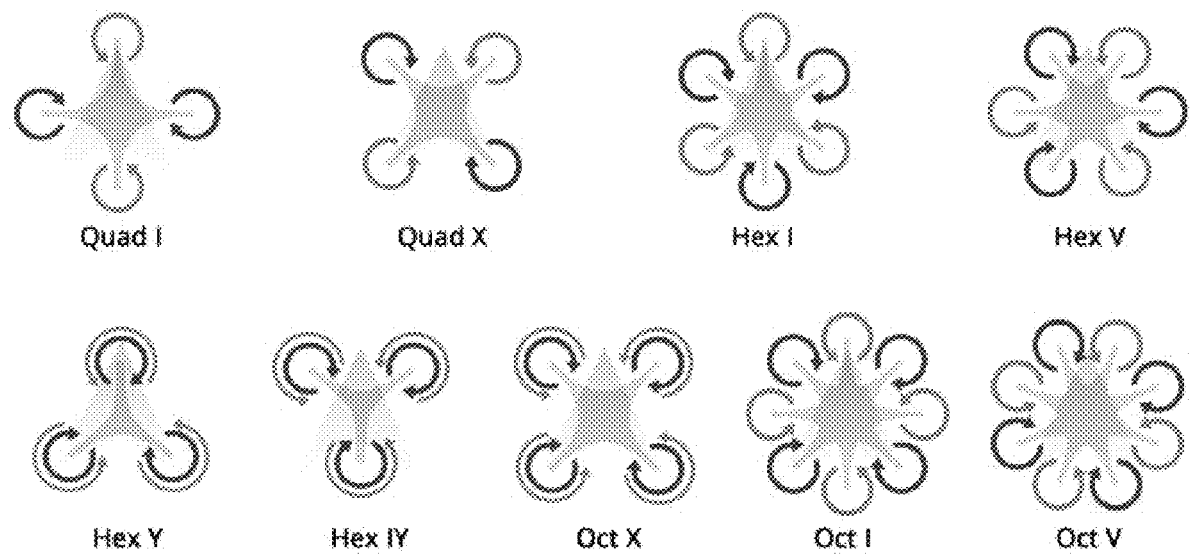
Figure 1I:
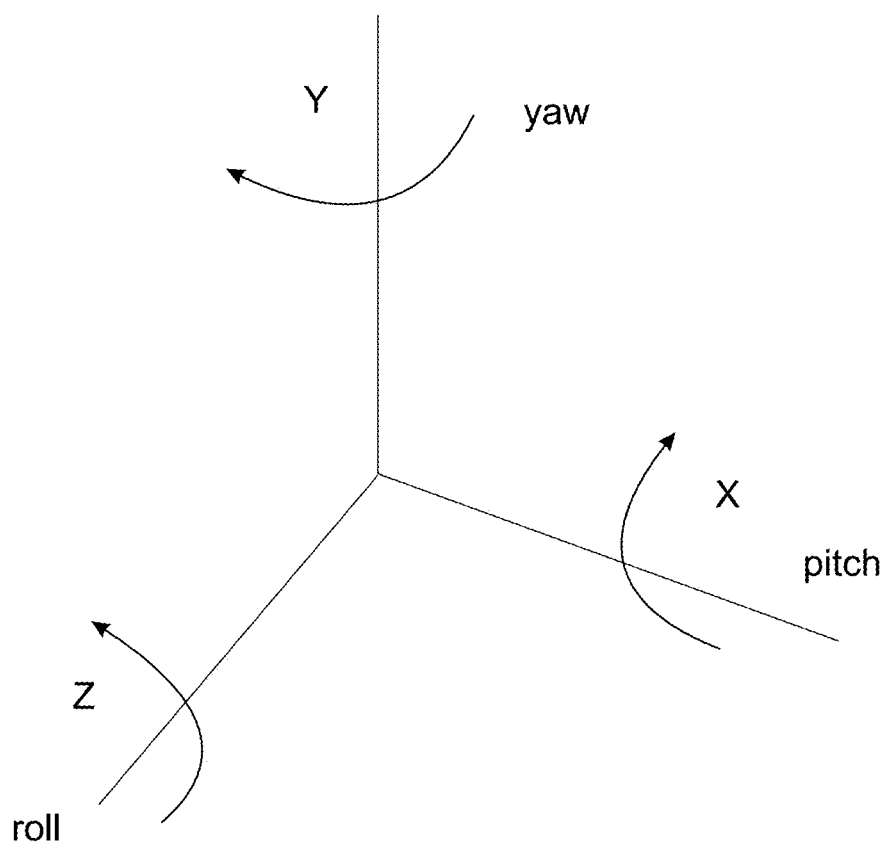
Figure 1J:
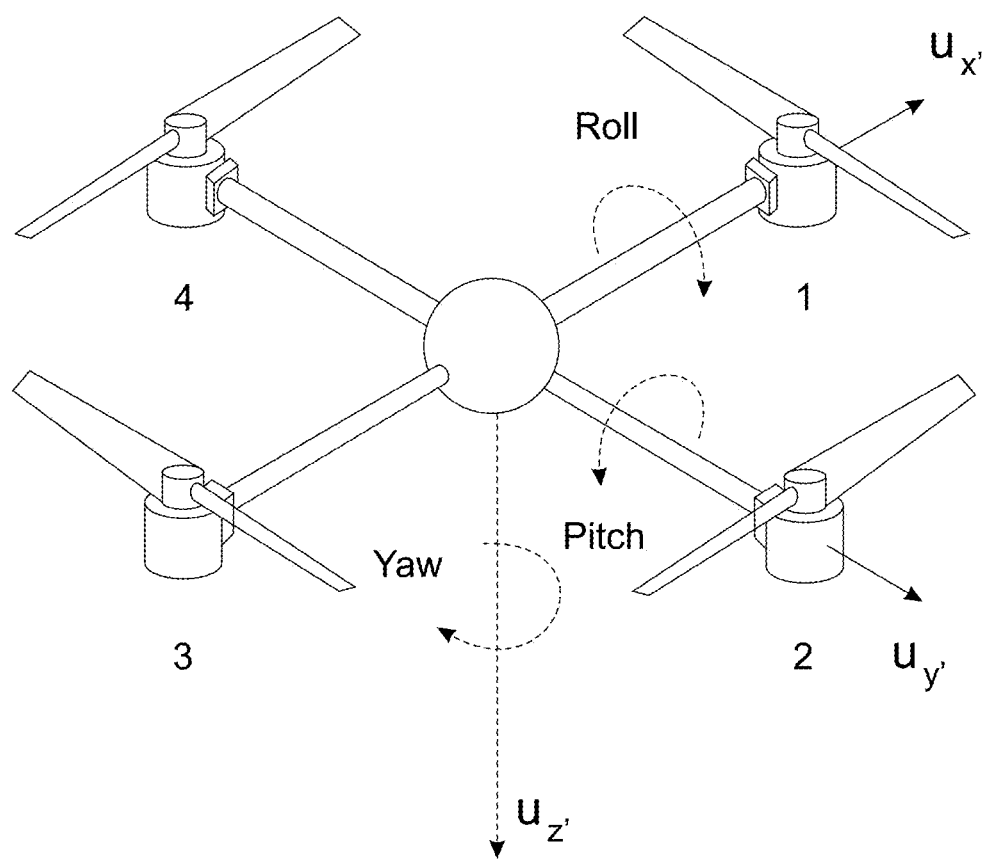
Figure 1K:
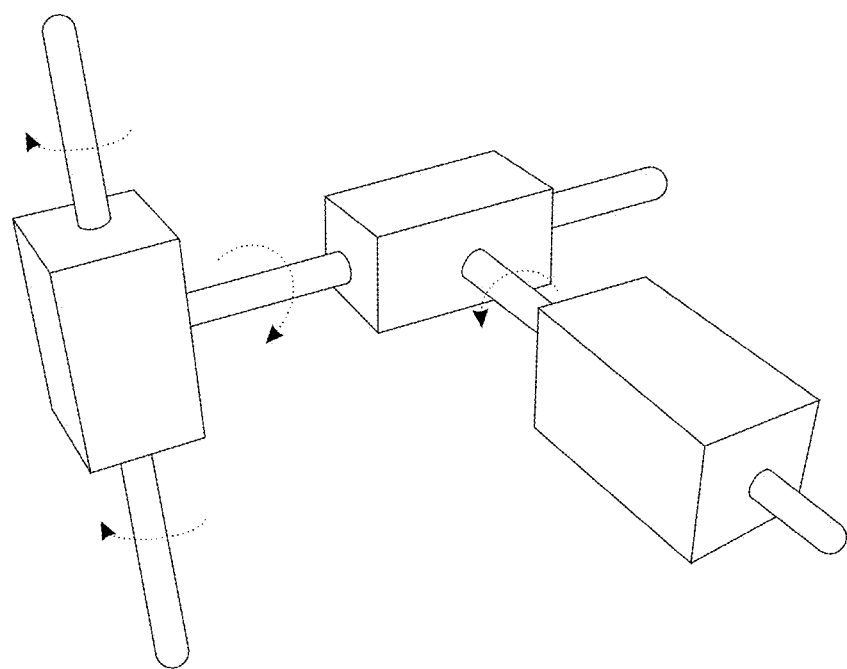
Figure 1L:
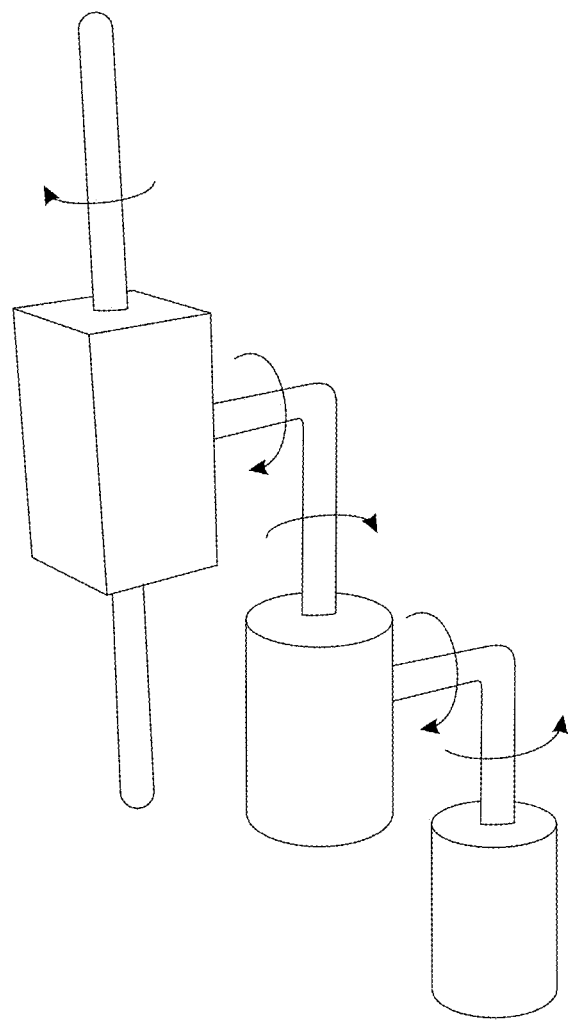

The aspects, features, and advantages of the present invention will be appreciated when considered with reference to the following description of exemplary embodiments, and the accompanying figures.

In this document, the words "embodiment," "variant," "example," and similar expressions refer to a particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar expressions and phrases are used to indicate one of a number of different possible embodiments. The number of possible embodiments is not necessarily limited to two or any other quantity. Characterization of an item as "exemplary" means that the item is used as an example. Such characterization of an embodiment does not necessarily mean that the embodiment is a preferred embodiment; the embodiment may but need not be a currently preferred embodiment. The embodiments are described for illustration purposes and are not necessarily strictly limiting.

The words "couple," "connect," and similar expressions with their inflectional morphemes do not necessarily require an immediate or direct connection (although they do include direct/immediate connections), but may also include connections through mediate elements within their meaning, unless otherwise specified or inherently required.

The term "flying machine" includes within its meaning (1) drones with autonomous operation by an onboard flight controller; (2) drones with autonomous operation by a remote flight controller via remote control; (3) drones remotely operated by a human operator via remote control; (4) flying apparatus operated by an onboard human pilot; and (5) flying apparatus capable of some mixture of two or more of the operational modes described above. A flying machine thus may but need not be a drone, and may but need not be hover-capable. A "hover capable flying machine," however, needs to be capable of hovering.

An "arm" or a "robotic arm" may be a manipulator arm; it may be articulated (that is, with one or more joints/pivots and two or more members) or non-articulated; an arm may be attached to the flying machine rigidly or non-rigidly, that is, via a rotary, universal, or other joint/pivot.

"Power source" and "energy bank" are used interchangeably to signify the source of energy for operation of a flying machine, such as energy for powering main rotor(s) of the machine.

Other and further definitions and clarifications of definitions may be found throughout this document.

Reference will now be made in detail to several embodiments and accompanying drawings. Same reference numerals are used in the drawings and the description to refer to the same apparatus elements and method steps. The drawings are in a simplified form, not necessarily to scale, and omit apparatus elements and method steps that can be added to the described apparatus and methods, while including certain optional elements and steps.

Figure 2A:
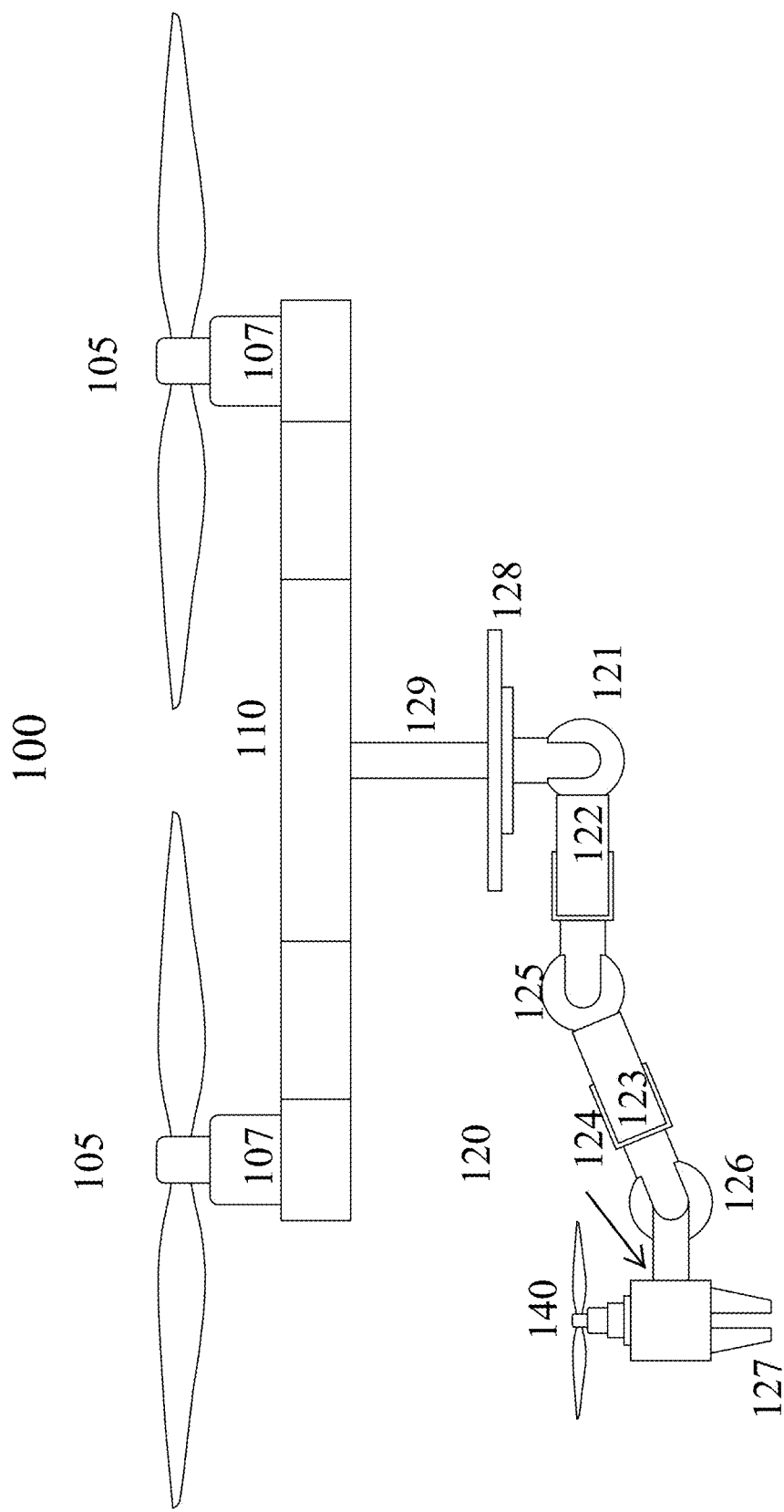
FIG. 2A is a side view illustrating selected components of a hover-capable flying machine with a robotic arm and using a balancing rotor assembly mounted on the robotic arm.
Figure 2B:
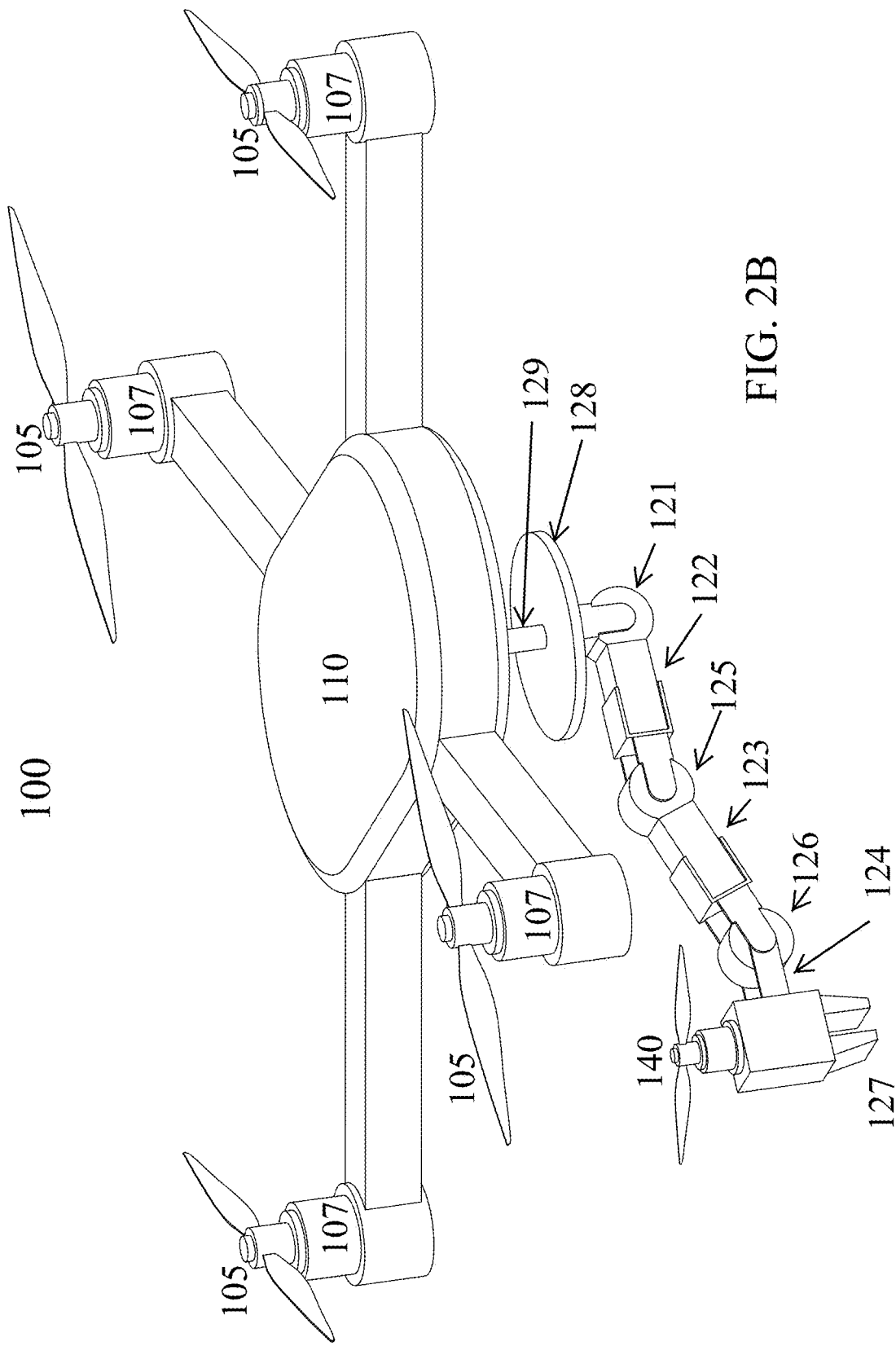
FIG. 2B is a perspective view illustrating selected components of the hover-capable flying machine of FIG. 2A.

FIGS. 2A and 2B illustrate selected components of a hover-capable flying machine ("HCFM") 100. The HCFM 100 includes main rotor assemblies 105, a body 110, and at least one power bank (not specifically illustrated in these Figures). The main rotor assemblies 105 here include quad counter-rotating coaxial rotors that may entirely or substantially entirely cancel each other's angular momentum or torque. In other embodiments, one or more than two pairs of coplanar counter-rotating rotors may be used, configured so that in each pair of the counter-rotating coplanar rotors the angular momentum or torque of an individual rotor of the pair entirely or substantially entirely cancels the angular momentum or torque of the other rotor of the pair. As shown in the Figures, engines/motors 107 power their respective rotor assemblies 105; in other embodiments, one or more engine/motors inside the body 110 activate the rotor assemblies 105, for example, through gears, chains, shafts, and similar power transmission components. The main rotor assemblies 105 may be tilting, either separately or together, so that the HCFM 100 may hover and move horizontally, like a helicopter. In embodiments, a boom with a tail rotor with a horizontal axis of rotation is included, and the main rotor assemblies 107 in such embodiments need not (but still may) include counter-rotating rotors. In embodiments, each main rotor assembly 107 includes counter-rotating coaxial rotors; examples of such rotor assemblies are illustrated in FIGS. 1H1 and 1H2. In embodiments, a single main rotor assembly is used in conjunction with a boom and a tail rotor, as in a typical helicopter with a single main rotor. Other HCFM arrangements may also be used.

In embodiments, the main rotor assemblies 105 and/or any other rotor assembly described in this document and/or shown in the Figures is a ducted fan assembly. In embodiments, some rotor assemblies are reversible; for example, an assembly's thrust direction may be reversible by rotating the assembly, reversing the polarity of the electrical energy applied, or changing gears in a transmission between a motor and one or more of the assembly's rotors.

The HCFM 100 also includes an articulated arm 120. As shown in the FIGS. 2A and 2B, the articulated arm 120 is attached to a platform 128 with a joint 121 and includes intermediate members 122 and 123, an end member (a.k.a. "end effector") 124, and joints 125 and 126 that allow articulation. The platform 128 is attached to the body 110 with a rotating shaft 129, so that the articulated arm 120 may be extended horizontally in any direction. The end member 124 may include at its end (away from the joint 126) a claw, a hook, a grasp, or another tool 127. The tool may be controllable, for example, allowing grasping and releasing of payloads. Other types of arms, articulated and non-articulated, may also be employed. In examples, the arm may be, for example, a Cartesian robotic arm, a cylindrical robotic arm, a spherical robotic arm, a selective compliance assembly robotic arm (SCARA), an articulated robotic arm, a parallel robotic arm, or an anthropomorphic robotic arm. The arm and any of its joints and/or other components may be operated or moved using, for example, electrical and/or hydraulic activation under control of a controller (e.g., the FCS of the HCFM 100 or another controller) and/or a pilot.

Above the tool 127 at the end of the arm 120 is a balancing rotor assembly 140. The axis of the balancing rotor assembly 140 is generally in a vertical direction, so that the lift generated by the balancing rotor assembly 140 may counterbalance the tool 127 with or without a payload held by the tool 127 (and possibly also or instead counterbalance some of the weight of the other portions of the arm 120). In embodiments, the balancing rotor assembly 140 includes coaxial counter-rotating rotors. In embodiments, the balancing rotor assembly 140 is or includes multiple (2, 3, 4, or more) rotors used for balancing. In embodiments, the balancing rotor assembly 140 is identical or similar (e.g., in dimensions, aerodynamics, available power, and/or lift-generation ability) to one of the main rotor assemblies 105 or one of the other rotor assemblies of the HCFM 100. In embodiments, the power (e.g., electrical power) for the balancing assembly 140 is provided from a power source located in the body 110 or another location of the HCFM 100. In embodiments, a common power source energizes the balancing rotor assembly 140 and the main rotor assemblies 105, and/or other rotor assemblies. In embodiments, the common power source, such as an electrochemical rechargeable or primary battery/cell, energizes all the rotors and propeller (if present) assemblies of the HCFM 100.

In embodiments, a controller (e.g., the FCS of the HCFM 100) is coupled to the at least one energy bank and automatically varies the power provided to the balancing rotor assembly 140 to reduce or minimize the forces resulting from pickup or release of a payloads by the tool 127. Thus, if the tool 127 is a claw or another attachment/grasping mechanism, the controller may simultaneously or substantially simultaneously release or lower to a surface the payload held by the tool 127 and reduce the power to the balancing rotor assembly 140; after grasping a payload, the controller may simultaneously or substantially simultaneously increase the power to the balancing rotor assembly 140, and the main rotor assemblies 105 to cause the HCFM 100 to ascend without tipping over because of the weight of the payload grasped/held by the tool 127 at the end of the extended arm 120. Thus, the controller may simultaneously or substantially simultaneously lower the payload held by the tool 127 by operating the arm 120 (such as lowering the end of the arm with the tool 127 with respect to the body 110) and reduce the power to the balancing rotor assembly 140; and simultaneously or substantially simultaneously raise the payload held by the tool 127 by operating the arm 120 (such as raising the end of the arm with the tool 127 and the payload with respect to the body 110) and increase the power to the balancing rotor assembly 140. In this way, the forces on the body 110 caused by the operation of the arm 120 are reduced or even eliminated.

In coordinating the actions of the arm 120 and the power driving the balancing rotor assembly 140, the controller may receive sensor readings that indicate the attitude (or changes in the attitude) of the body 110, and/or the force/torque between the arm 120 and the platform 128, and/or the force/torque between the members of the arm 120. The controller may receive and use (for balancing, in a feedback manner) input from any sensors that indicate the attitude or changes in attitude of the HCFM 100 and/or the balance between the load carried by the tool 127 and the lift generated by the balancing rotor assembly 140. If the HCFM 100 is operated by a human (such as an onboard or remote pilot), the pilot may provide the coordinated action. The human pilot may rely on his or her senses in determining the attitude if the HCFM and/or on a screen display showing images received by one or more HCFM onboard or external cameras.

While the above examples focus on the initial pickup or drop-off of the payload, the same general approach with necessary variations may be employed when the arm 120 is extended away from or brought closer to the body 110, with or without a payload. The balancing rotor assembly 140 may also be operated in flight to improve flight characteristics of the HCFM 100. In embodiments, the arm 120 may be operated so that the axis of the balancing rotor assembly 140 has a horizontal component, for example, the axis may be completely or almost completely horizontal, and the balancing rotor assembly may thus be used to provide horizontal propulsion for the HCFM 10M.

The HCFM 100 may be a quadrone with four main rotor assemblies, wherein each pair of two oppositely disposed rotors has the same angular velocity, one pair of rotors rotating clockwise and the other pair rotating counterclockwise. As noted above, other numbers of rotors may be used, including even numbers of main rotor assemblies with paired rotors, and odd numbers of main rotor assemblies.

In embodiments, the main rotor assemblies 105 of the HCFM 100 include at least one pair of coaxial counter-rotating rotors configured to cancel angular momentum generated by each rotor of the at least one pair of coaxial counter-rotating rotors. In embodiments, the main rotor assemblies 105 of the HCFM 100 include at least one pair of coaxial counter-rotating rotors configured to cancel angular momentum generated by each rotor of the at least one pair of coaxial counter-rotating rotors. In embodiments, the main rotor assemblies of the HCFM 100 include three pairs of coaxial counter-rotating rotors. In embodiments, the main rotor assemblies of the HCFM 100 are arranged in other configurations described in this document, such as Quad I, Quad X, Hex I, Hex V, Hex Y, Hex IY, Oct X, Oct I, and Oct V configuration.

Figure 3A:
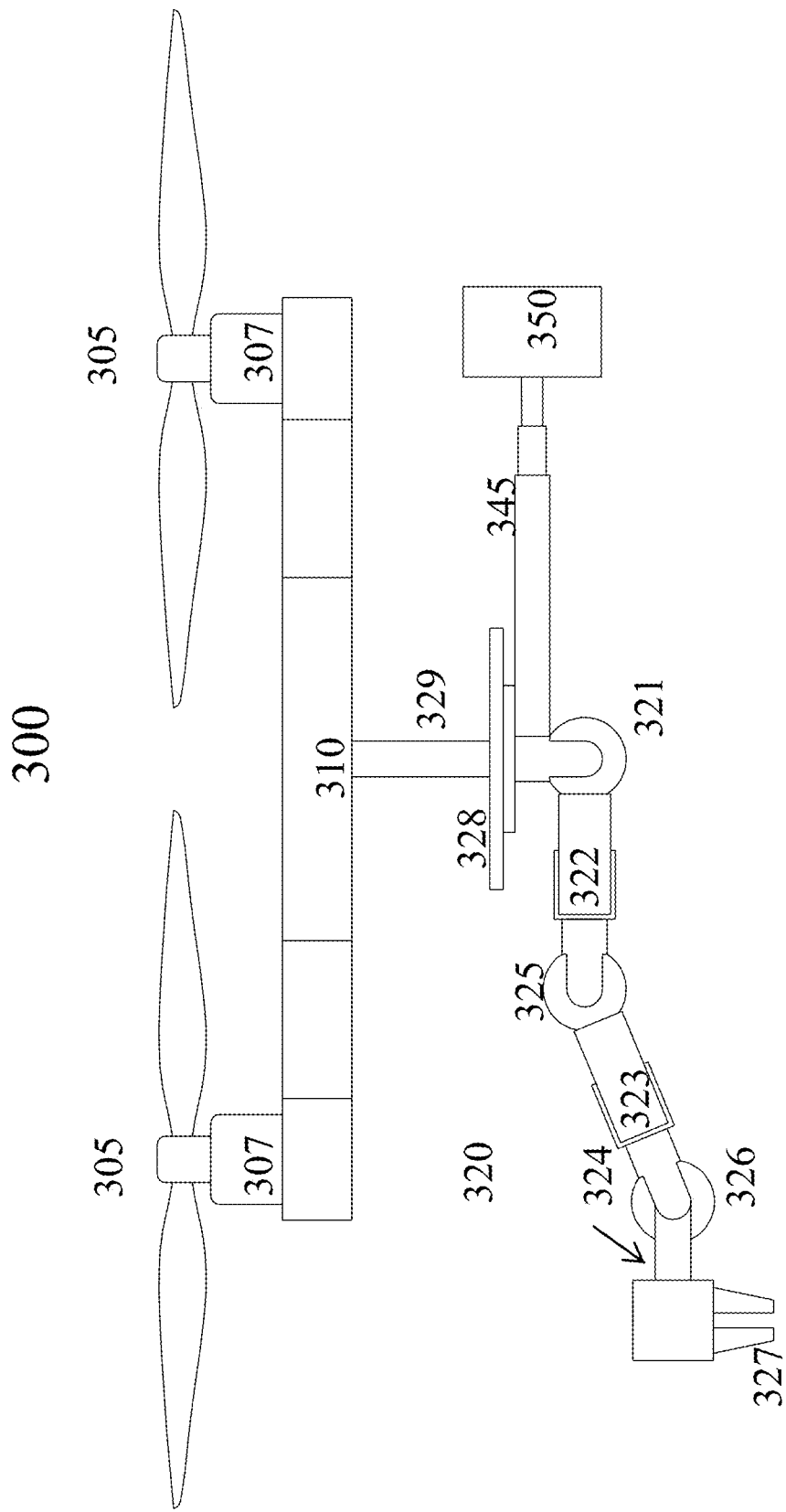
FIG. 3A is a side view illustrating selected components of a hover-capable flying machine with a robotic arm, balanced by shifting an energy bank on a telescoping boom, with the telescoping boom in a contracted or shortened state.
Figure 3B:
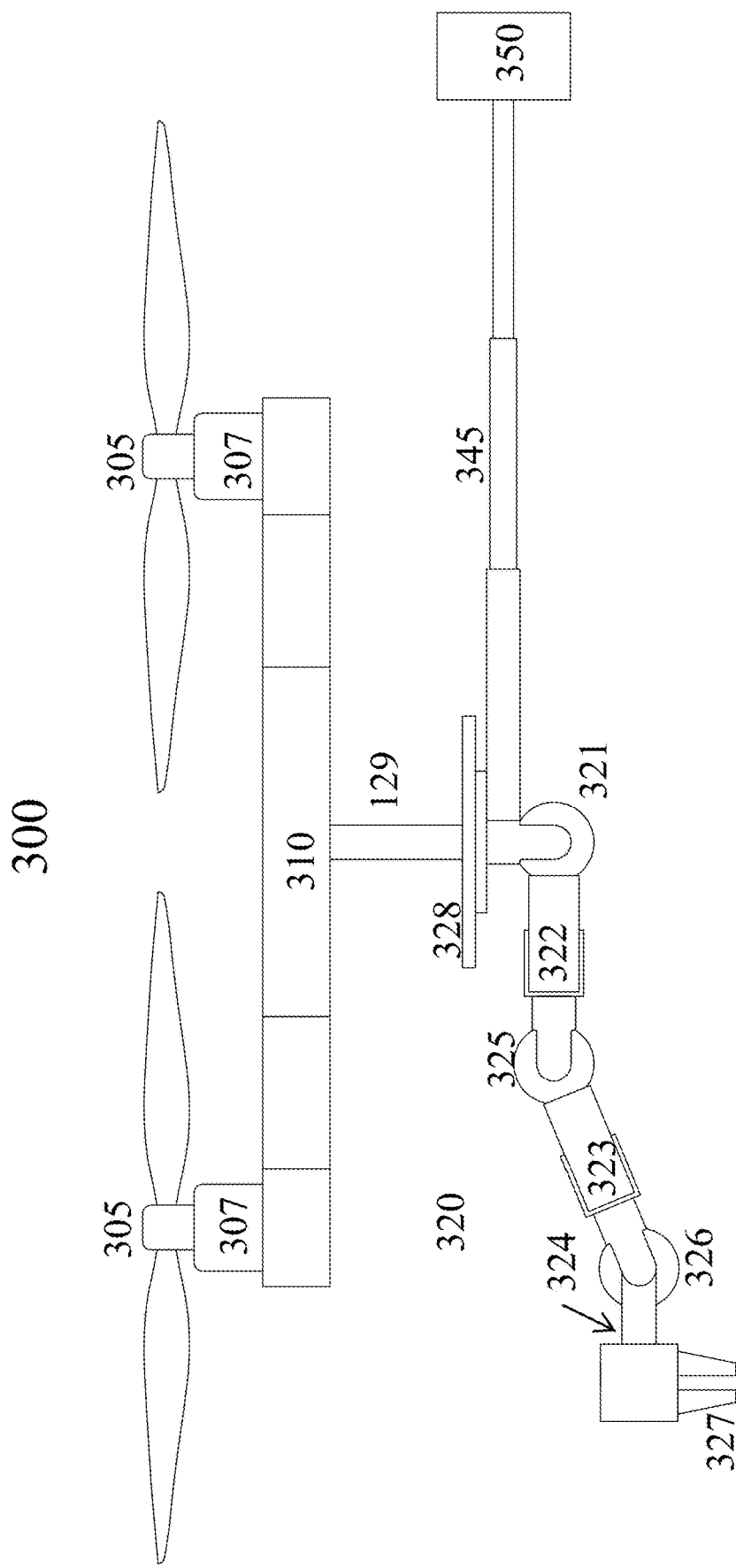
FIG. 3B is a perspective view illustrating selected components of the hover-capable flying machine of FIG. 3A with the telescoping boom in an extended state.

FIGS. 3A and 3B illustrate selected components of an HCFM 300 that is balanced in a different way. The HCFM 300 is similar to the HCFM 100 described above. It includes main rotor assemblies 305 similar or identical to the main rotor assemblies 105; and a body 310, similar or identical to the body 110. Thus, each of the main rotor assemblies 305 may include dual counter-rotating coaxial rotors that entirely or substantially entirely cancel each other's angular momentum or torque, or one or more pairs of coplanar counter-rotating rotors configured so that in each pair the counter-rotating coplanar rotors entirely or substantially entirely cancel each other's angular momentum or torque. As shown in the Figures, engines/motors 307 power their respective rotor assemblies 305; in embodiments, one or more engine/motors inside the body 310 activate the rotor assemblies 305, for example, through gears, chains, shafts, and similar power transmission components. The main rotor assemblies 305 may be tilting, so that the HCFM 300 may hover and move horizontally, as a helicopter. In embodiments, the main boom with a tail rotor with a horizontal axis of rotation is included, and the main rotor assemblies 305 or assemblies in such embodiments need not (but still may) include counter-rotating rotors. In other embodiments, multiple counter-rotating main rotors with different axes of rotation may be present. In still other embodiments, multiple assemblies of counter-rotating rotors may be present. Other HCFM arrangements may also be used.

The HCFM 300 also includes an articulated arm 320, which is similar or identical to the articulated arm 120. As shown in FIGS. 3A and 3B, the articulated arm 320 is attached to a platform 328 with a joint 321 and includes intermediate members 322 and 323, an end member or end effector 324, and joints 325 and 326 that allow articulation. The platform 328 is attached to the body 310 with a rotating shaft 329, so that the articulated arm 320 may be extended horizontally in any direction. The end member 324 may include at its end (away from the joint 326) a claw, a hook, a grasp, or another tool 327. The tool may be controllable, for example, allowing grasping and releasing of payloads. Other types of arms, articulated and non-articulated, may also be employed. In examples, the arm may be, for example, a Cartesian robotic arm, a cylindrical robotic arm, a spherical robotic arm, a selective compliance assembly robotic arm (SCARA), an articulated robotic arm, a parallel robotic arm, or an anthropomorphic robotic arm. The arm and any of its joints and/or other components may be operated or moved using, for example, electrical and/or hydraulic activation under control of a controller (e.g., the FCS of the HCFM 300 or another controller) and/or a pilot.

Note that here, unlike in the HCFM 100, there is no balancing rotor assembly above the tool 327. The balancing is achieved by shifting an energy bank 350 (power source that energizes the HCFM 300) relative to the body 310. As shown in FIGS. 3A and 3B, a telescoping power boom 345 is attached to the platform 328 substantially opposite the attachment of the arm 320, and the energy bank 350 is attached at the opposite end of the telescoping power boom 345. The energy bank 350 may be, for example, one or more batteries or fuel cells or fuel tanks.

FIG. 3A illustrates the HCFM 300 with the telescoping power boom 345 in a shortened/contracted/pulled-in state. FIG. 3B illustrates the HCFM 300 with the telescoping power boom 345 in an extended state. The telescoping power boom 345 is made of a number of tubular sections of a progressively smaller diameter so that they fit inside each other in a nesting arrangement. Telescoping power boom 345 can be extended and contracted using a motor controlled by the FCS or another controller of the HCFM 300 to move the energy bank away from the body 310 and closer to the body 310, respectively. The FCS controls the motor to compensate for the changes such as those resulting from extending the arm 320, picking up payloads, and dropping off payloads, for example, keeping the center of gravity of the HCFM 300 substantially the same with respect to the body of the HCFM 300. The length of the power boom 345 may also be varied by the controller through, for example, a hydraulic cylinder activator.

Figure 4:
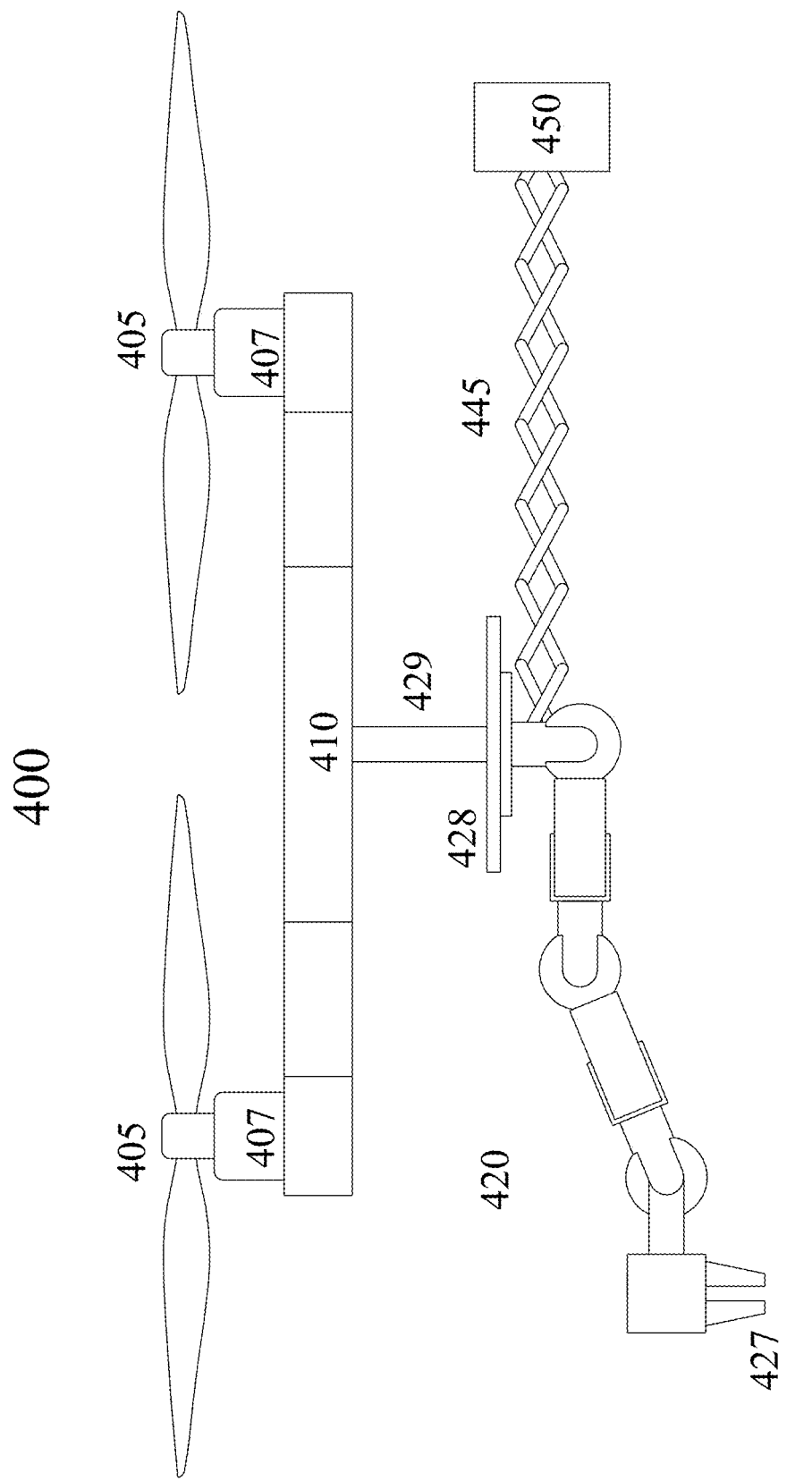
FIG. 4 is a side view illustrating selected components of a hover-capable flying machine with a robotic arm, balanced by shifting an energy bank on an accordion- or scissor-type boom.

FIG. 4 illustrates selected components of an HCFM 400 that is similar to the HCFM 300 discussed above. Here, however, a power boom 445 that carries an energy bank 450 is an accordion-type or scissor-type extender device that can be extended and contracted using a motor controlled by the FCS or another controller of the HCFM 400 to move the energy bank 450 away from the body 410 and closer to the body 410, respectively. The FCS controls the motor to compensate for the changes such as those resulting from extending the arm 420, picking up payloads, and dropping off payloads, for example, keeping the center of gravity of the HCFM 400 substantially the same with respect to the body of the HCFM 400. The length of the power boom 445 may also be varied by the controller through, for example, a hydraulic cylinder activator.

Figure 5:
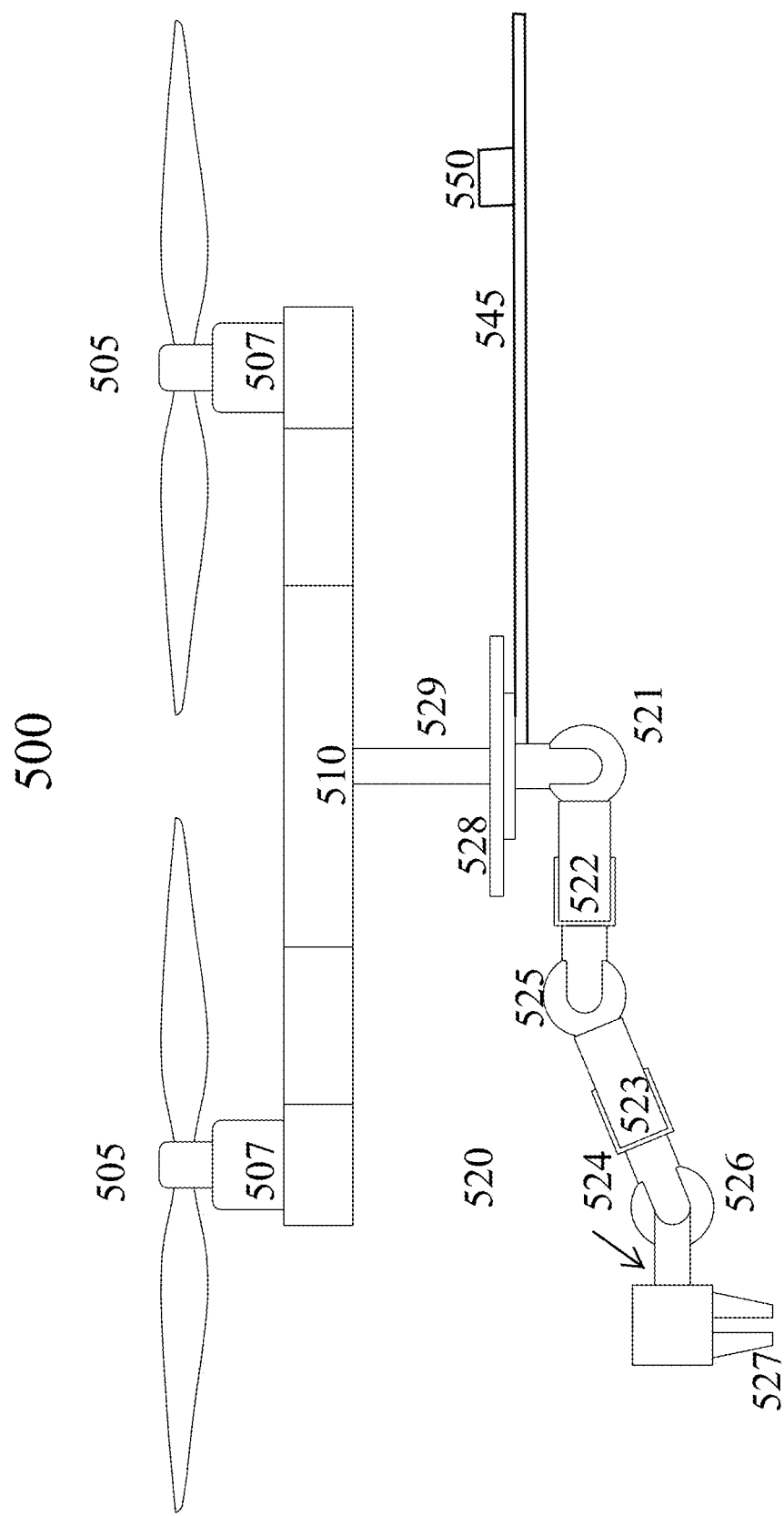
FIG. 5 is a side view illustrating selected components of a hover-capable flying machine with a robotic arm, balanced by moving an energy bank along a fixed boom.

FIG. 5 illustrates selected components of an HCFM 500 that is also very similar to the HCFM 300 discussed above. Here, however, a power boom 545 is of a fixed length. An energy bank 550 can be moved along the power boom 545 by a small motor or servomechanism controlled by a controller; for example, the small motor can cause the energy bank 550 to move back and forth, as needed, along one, two, or any number of parallel rails.

In the HCFMs 300, 400, and 500, when a payload object needs to be released by the tool at the end of the robotic arm, the releasing action may be coordinated by the controller with the movement of the energy bank towards the center of gravity of the HCFM; and when the payload is lifted by the tool, the lifting action may be coordinated by the controller with the movement of the energy bank away from the center of gravity of the HCFM. Similarly, when the robotic arm is extended (with or without a payload) or pulled-in (again, with or without a payload) the extension or pulling-in action may be coordinated with the movement of the energy bank away from or towards the center of gravity of the HCFM, as needed for balancing of the HCFM. Thus, the controller (FCS or another controller) controls the movement of the power bank to compensate for the changes such as those resulting from extending the robotic arm, picking up payloads, and dropping off payloads, for example, keeping the center of gravity of the HCFM (including the payload) substantially the same with respect to the body of the HCFM.

Figure 6A:
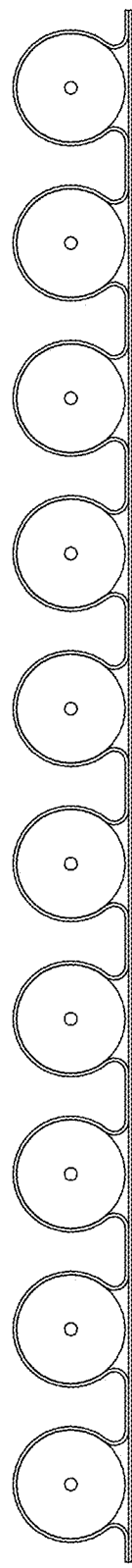
FIG. 6A is a side view illustrating a power bandolier tail made with cylindrical cells, in a fully extended configuration.
Figure 6B:
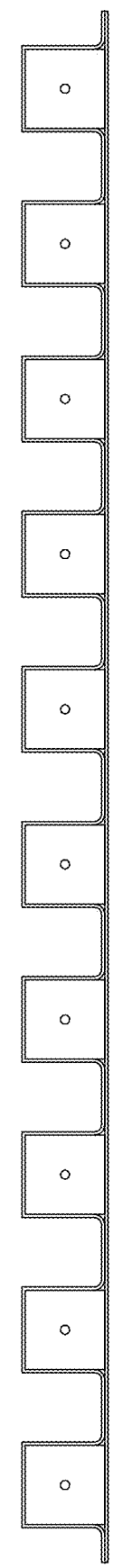
FIG. 6B is a side view illustrating a power bandolier tail made with quadrangular cells, in a fully extended configuration.
Figure 6C:
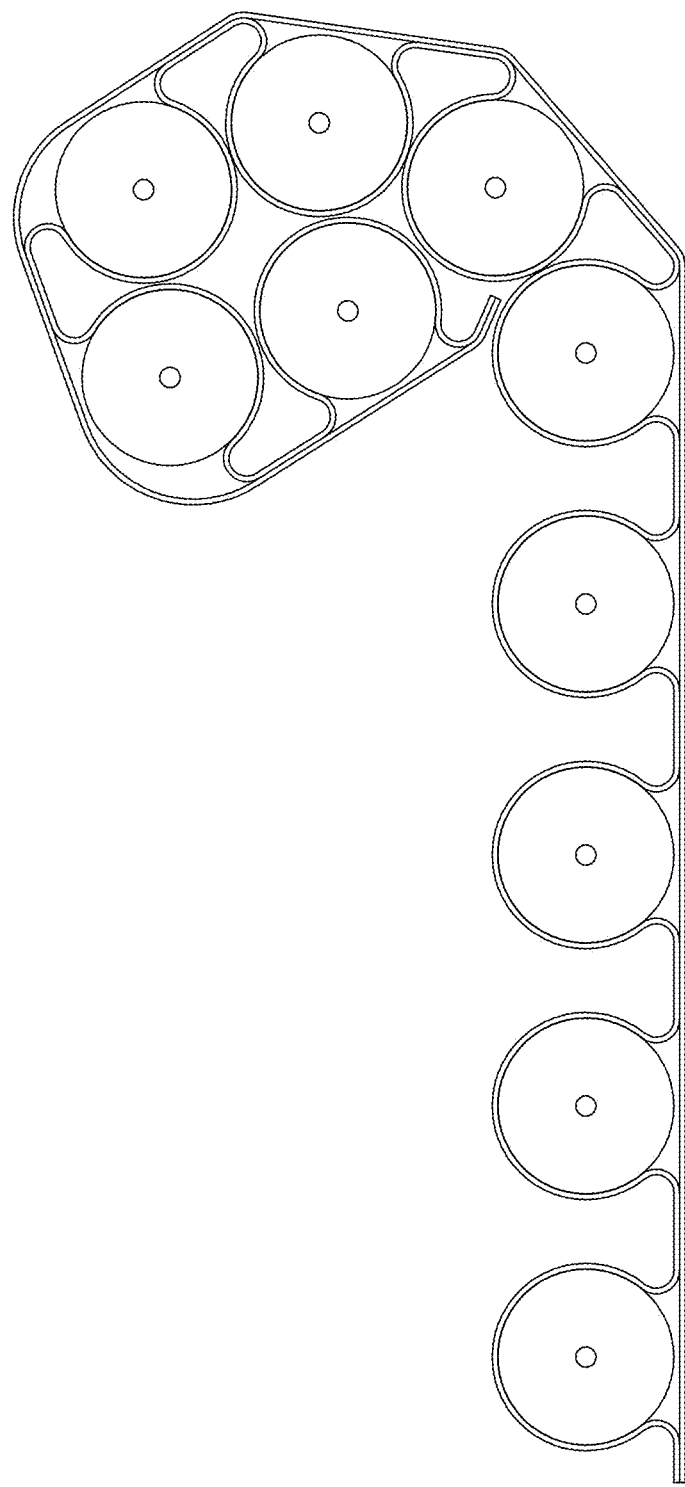
FIG. 6C is a side view illustrating the power bandolier tail of FIG. 6A made with cylindrical cells, in a partially rolled-in configuration.
Figure 6D:
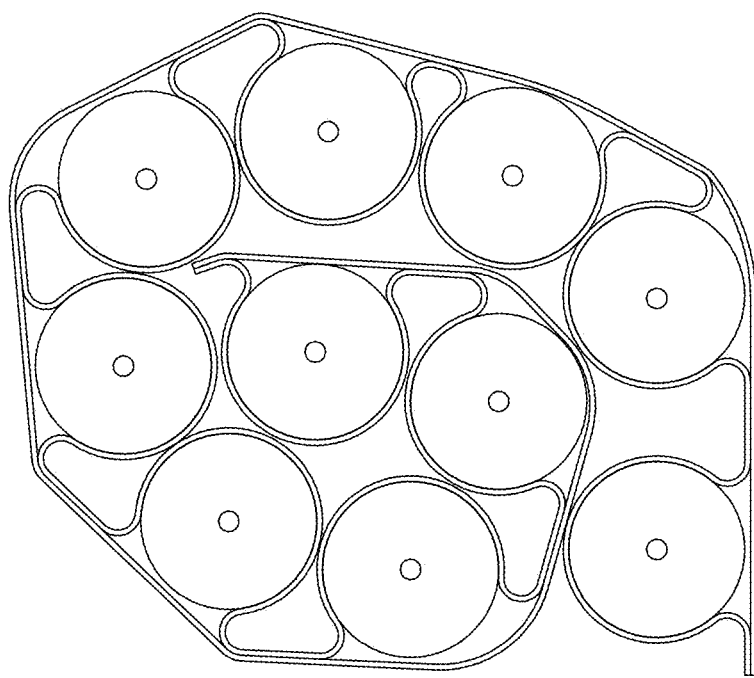
FIG. 6D is a side view illustrating the power bandolier tail of FIG. 6A made with cylindrical cells, in a completely rolled-in configuration.
Figure 6E:
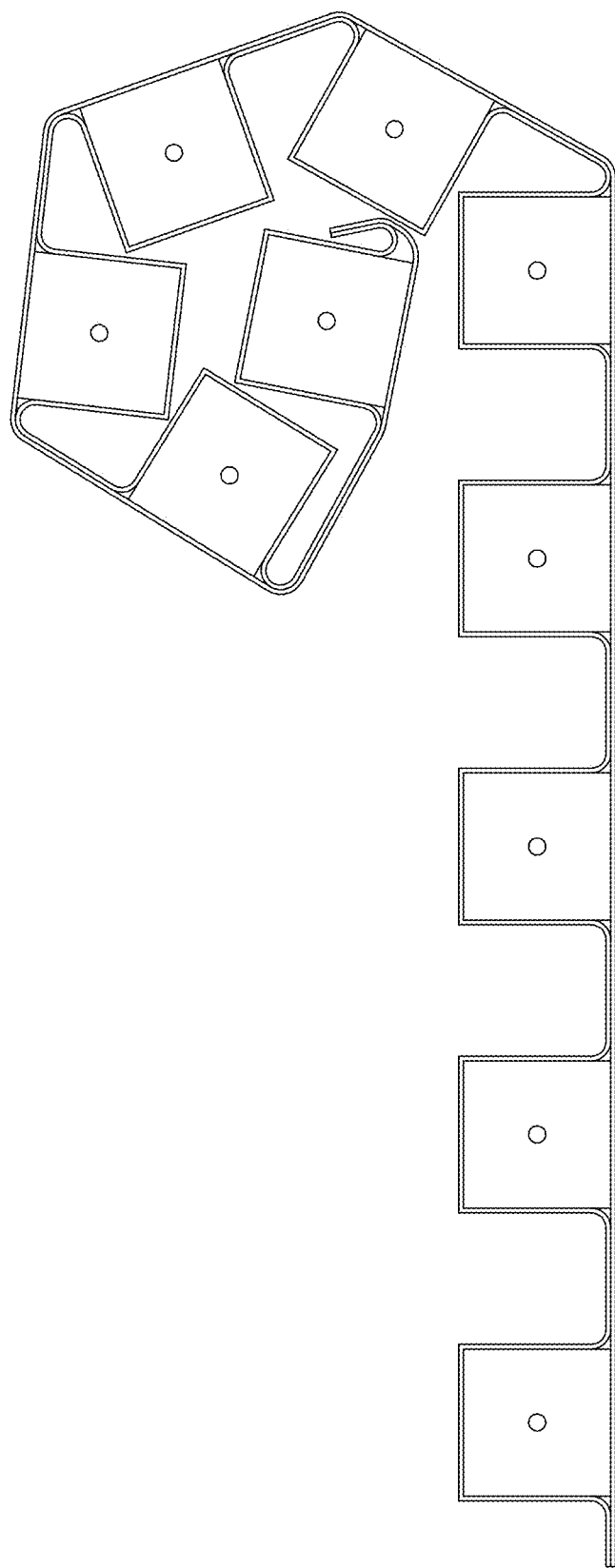
FIG. 6E is a side view illustrating the power bandolier tail of FIG. 61B made with quadrangular cells, in a partially rolled-in configuration.
Figure 6F:
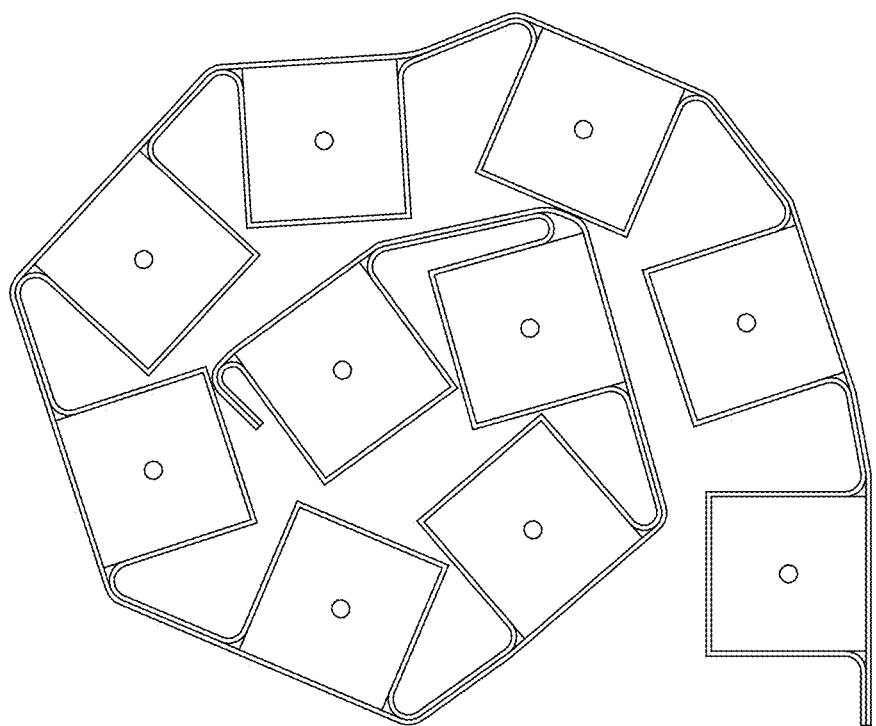
FIG. 6F is a side view illustrating the power bandolier tail of FIG. 6B made with quadrangular cells, in a completely rolled-in configuration.

In other embodiments, cells (e.g., electrochemical cells/batteries) of an energy bank are held by a belt- or bandolier-like device acting as a flexible "tail" of the aircraft. In such a "bandolier" device, a number of energy cells are held flexibly, similarly to the way cartridges are held in a real cartridge bandolier; the cells are arranged lengthwise in the bandolier device, and the bandolier device with the cells can be curled-in (rolled-in) or curled-out (rolled-out), so that its center of gravity is varied in a controlled manner. We may refer to such a device as a "cell bandolier" or "power bandolier." Examples of such power bandoliers are illustrated as follows: (1) FIG. 6A illustrates a power bandolier made of cylindrical cells, in its elongated/extended (not rolled-in) configuration; (2) FIG. 6B illustrates a power bandolier made of quadrangular cells, in its elongated/extended (not rolled-in) configuration; (3) FIG. 6C illustrates the power bandolier of FIG. 6A made of cylindrical cells, in a partially rolled-in configuration; (4) FIG. 6l) illustrates the power bandolier of FIG. 6A made of cylindrical cells, in a completely rolled-in configuration; (5) FIG. 6E illustrates the power bandolier of FIG. 6B made of quadrangular cells, in a partially rolled-in configuration; and (6) FIG. 6F illustrates the power bandolier of FIG. 6B made of quadrangular cells, in a completely rolled-in configuration.

Figure 7A:
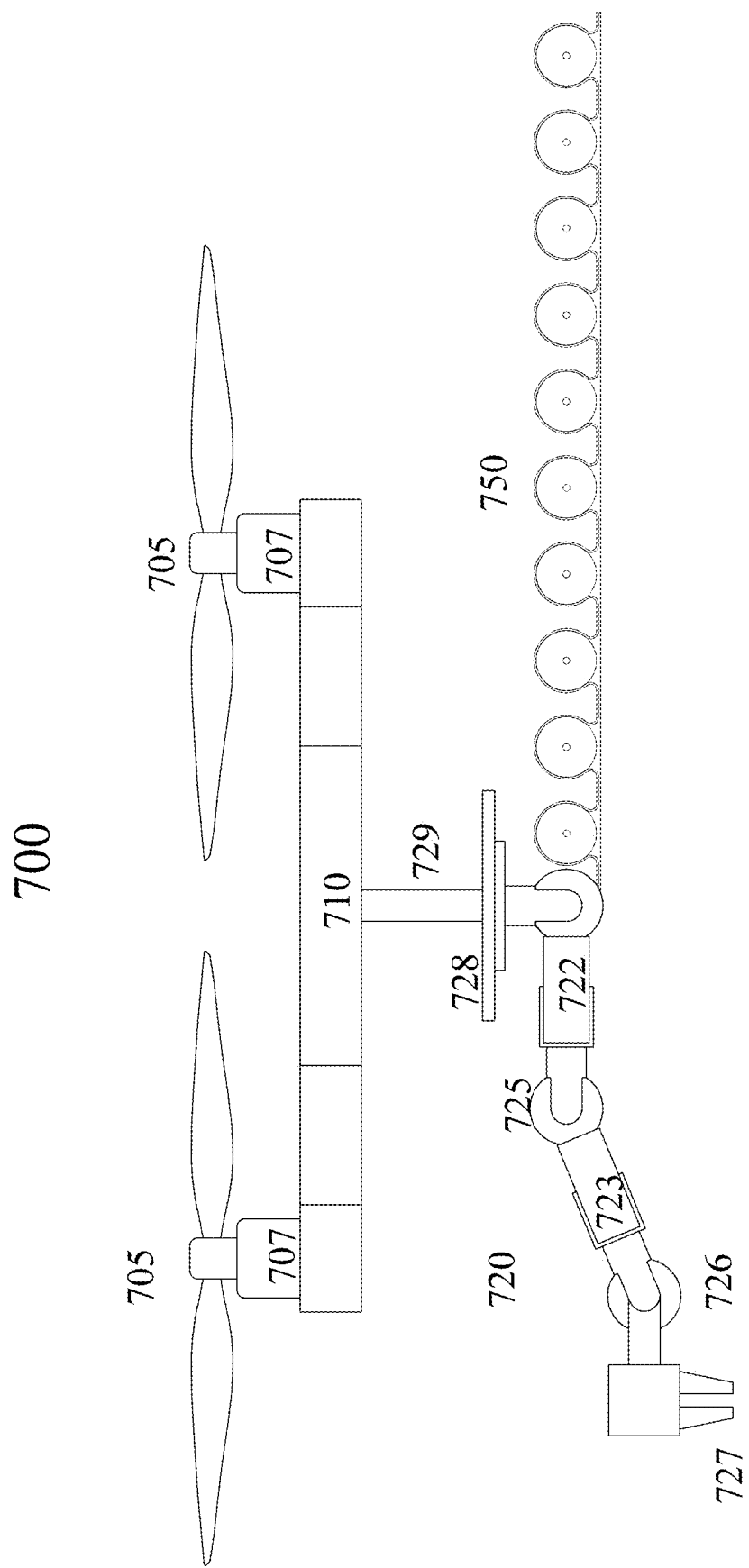
FIG. 7A is a side view illustrating selected components of a hover-capable flying machine with a robotic arm and a cylindrical power cell bandolier tail in an extended configuration.

An example of a drone 700 with such a cylindrical cell bandolier 750 is illustrated in FIGS. 7A (side view, power cell bandolier extended), 7B (perspective view, power cell bandolier extended), and 7C (side view, power cell bandolier partially rolled-in). This embodiment is similar to the HCFM 300/400/500, with the exception of the weight-shifting mechanism. Here, the weight shifting mechanism is the power cell bandolier 750 with cylindrical power cells.

Figure 8A:
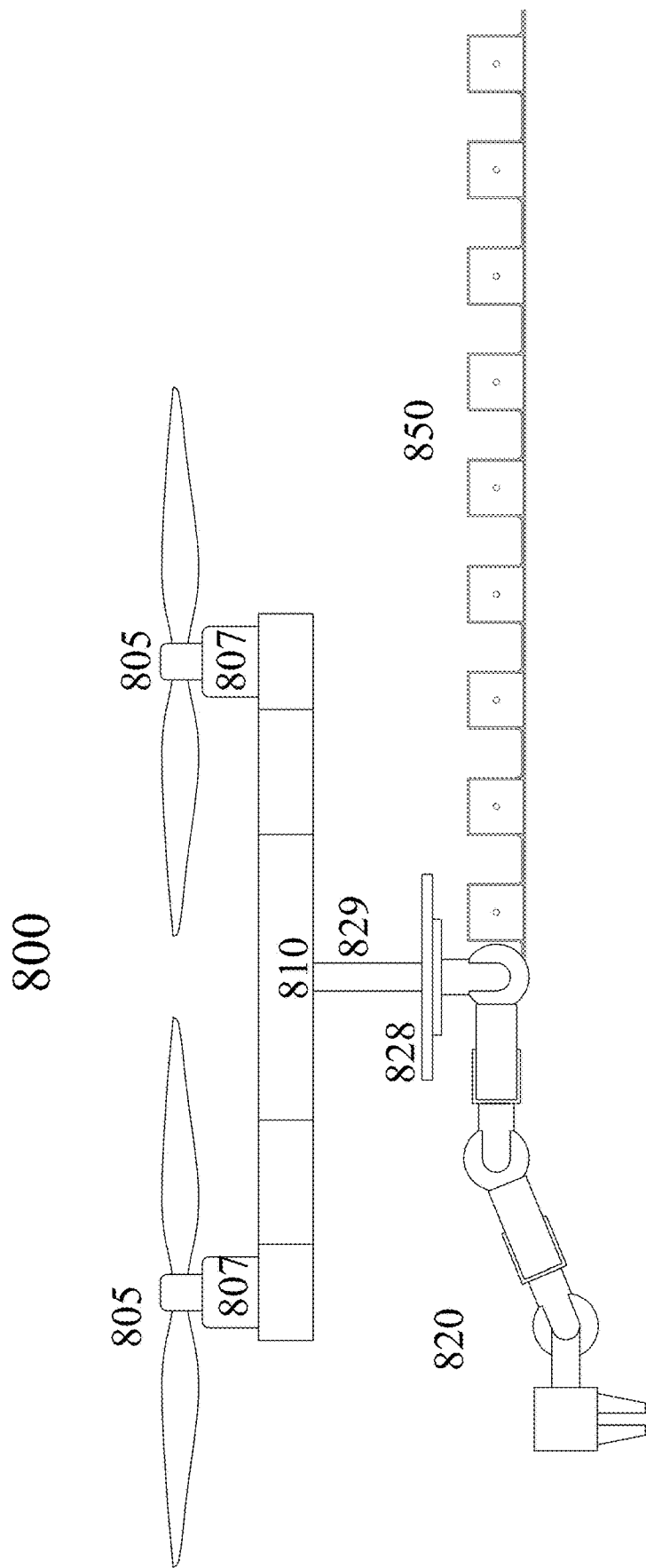
FIG. 8A is a side view illustrating selected components of a hover-capable flying machine with a robotic arm and a quadrangular power cell bandolier tail in an extended configuration.

An example of a drone 800 with a quadrangular cell bandolier 850 is illustrated in FIGS. 8A (side view, power cell bandolier extended) and 8B (side view, power cell bandolier partially rolled-in). This embodiment is also similar to the HCFM 300/400/500, with the exception of the weight-shifting mechanism. Here, the weight shifting mechanism is the power cell bandolier 850 with quadrangular power cells.

Figure 7B:
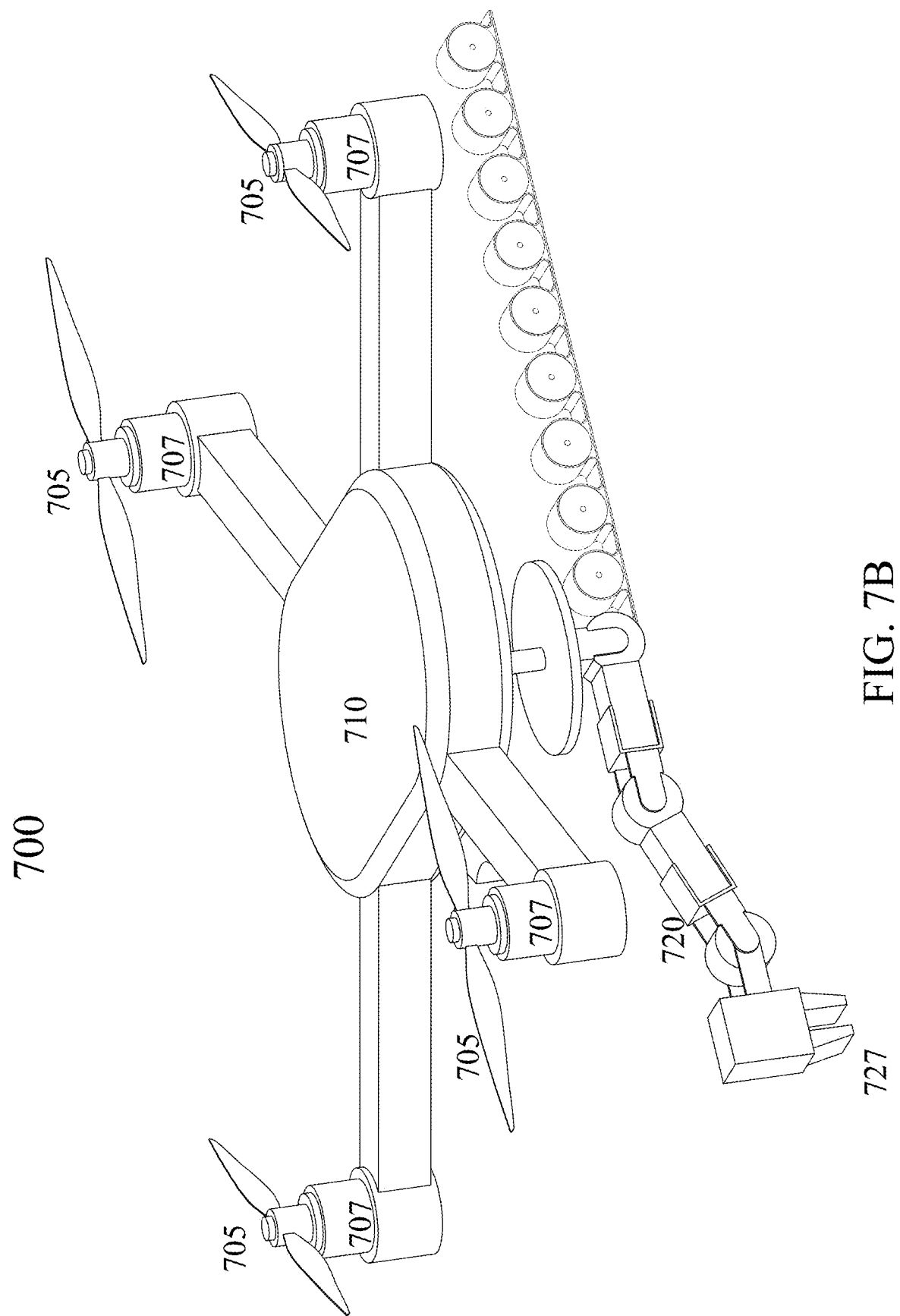
FIG. 7B is a perspective view illustrating selected components of the hover-capable flying machine of FIG. 7A.
Figure 7C:
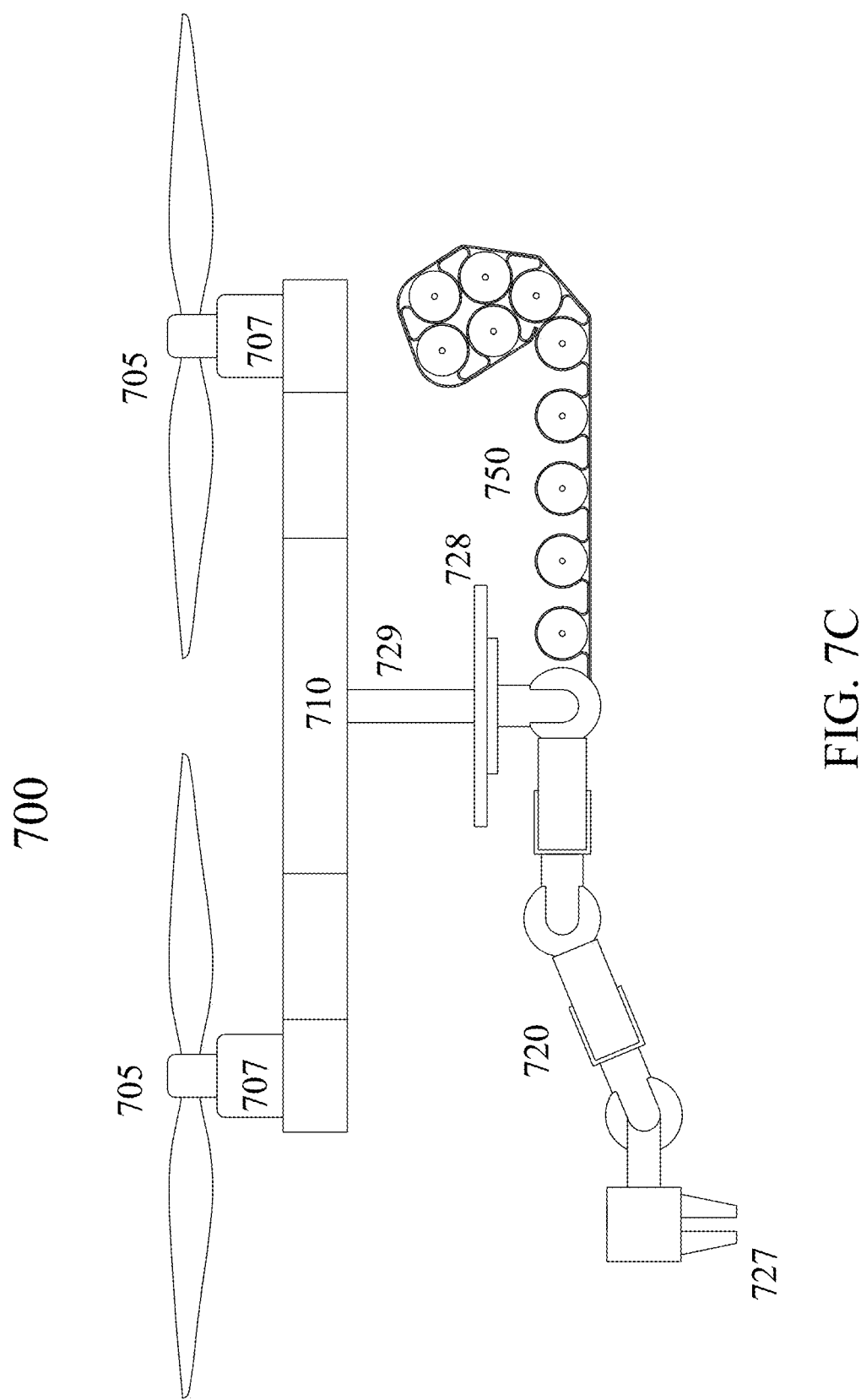
FIG. 7C is a side view illustrating selected components of the hover-capable flying machine of FIGS. 7A and 7B where the power cell bandolier tail is in a partially rolled-in configuration.
Figure 8B:
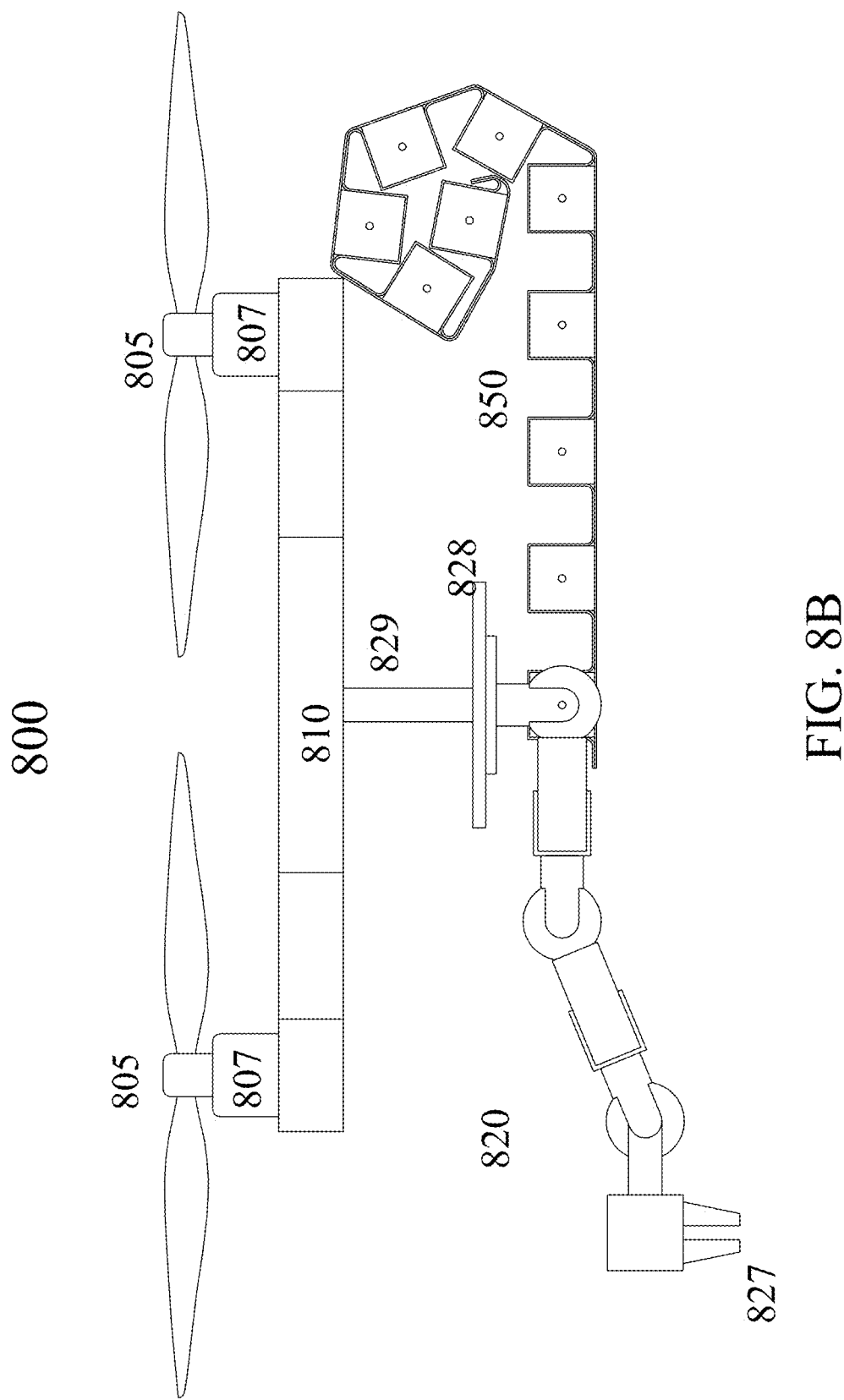
FIG. 8B is a side view illustrating selected components of the hover-capable flying machine of Figure SA where the power cell bandolier tail is in a partially rolled-in configuration.

It should be noted that, although FIGS. 6-8 illustrate cylindrical and quadrangular (square) power cells, cells of other geometries may also be used in the power bandolier; indeed, cells of a general rectangular cross-section are expressly contemplated.

In the HCFMs 700 and 800, a small motor or servomechanism is controlled by the HCFM's FCS or another controller, to roll and unroll the cells of the bandolier 750/850. The unrolling takes place in the general direction opposite to the direction of extension of the robotic arm of the HCFM. In a "dragonfly design," for example, the arm may be attached to the "front" of the HCFM body, while the bandolier is unrolled away from the HCFM body towards the "rear" of the HCFM body, to counterbalance the payload weight and the weight of the arm.

In embodiments, an HCFM has multiple robotic arms. One or more or all of the arms may be equipped with balancing rotor assemblies.

In embodiments, an HCFM has multiple weight shifting instrumentalities such as one or more controllable power cell bandoliers and/or one or more power sources movable on sets of one or more rails and/or scissor extenders and/or telescopic arrangements, extending in the same or different directions.

In embodiments, the main rotor assembly and/or any other rotor assembly (e.g., balancing rotor assembly) includes a reaction engine, such as a rocket engine, turbofan, or a jet. Obviously, here the "rotor" in the term "rotor assembly" should not be taken as literally descriptive but instead signifying a device for creating thrust.

In embodiments, the balancing rotor assembly (or multiple assemblies) and/or weight shifting instrumentalities are also used by the controller to compensate for other forces acting on the HCFM, such as wind, turbulence, and collision/impact forces.

Although method steps may be described serially in this document, certain steps may be performed by same and/or separate elements in conjunction or in parallel, asynchronously or synchronously, in a pipelined manner, or otherwise. There is no particular requirement that the steps be performed in the same order in which this description lists them or the Figures show them, except where a specific order is inherently required, explicitly indicated, or is otherwise made clear from the context. Furthermore, not every illustrated step may be required in every embodiment in accordance with the concepts described in this document, while some steps that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The features described throughout this document may be present individually, or in any combination or permutation, except where the presence or absence of specific elements/limitations is inherently required, explicitly indicated, or otherwise made clear from the context.

Although this document describes in detail the inventive apparatus and methods for balancing flying machines with reference to particular embodiments, it was done for illustration purposes, and it is to be understood that these embodiments are merely illustrative of the principles and applications of the present invention(s). It is, therefore, to be understood that numerous modifications may be made to the illustrative embodiments and that other arrangements may be devised without departing from the spirit and scope of the present invention as defined by the appended claims. Neither the specific embodiments of the invention or inventions as a whole, nor those of its/their features necessarily limit the general principles underlying the invention(s). The specific features described herein may be used in some embodiments, but not in others, without departure from the spirit and scope of the invention as set forth herein. Various physical arrangements of components and various step sequences also fall within the intended scope of the invention. Many additional modifications are intended in the foregoing disclosure, and it will be appreciated by those of ordinary skill in the art that in some instances some features of the invention will be employed in the absence of a corresponding use of other features. The illustrative examples, therefore, do not necessarily define the metes and bounds and the legal protection afforded the invention or inventions, which are only defined by the claims.

INDUSTRIAL APPLICABILITY

The present invention enjoys wide industrial applicability including, but not limited to, designing and operating aircraft capable of hovering.

I claim:

1. A flying machine, the flying machine comprising:
   a body;
   at least one robotic arm extending from the body, said at least one robotic arm comprising an effector, said at least one robotic arm ending in the effector;
   one or more main rotor assemblies;
   an extendable tail positioned on the opposite side of the body with respect to said at least one robotic arm;
   a power pack stored substantially at the end of the extendable tail;
   a motor for moving the power pack in relation to the body by regulating length of the extendable tail; and
   a controller linked to the motor, wherein the controller is configured to maintain the center of mass of the flying machine in response to changes in payload carried by the effector;
   wherein the extendable tail is a telescopic tail.

2. A flying, the flying machine comprising:
   a body;
   at least one robotic arm extending from the body, said at least one robotic arm comprising an effector, said at least one robotic arm ending in the effector;
   one or more main rotor assemblies;
   an extendable tail positioned on the opposite side of the body with respect to said at least one robotic arm;
   a power pack stored substantially at the end of the extendable tail;
   a motor for moving the power pack in relation to the body by regulating length of the extendable tail; and
   a controller linked to the motor, wherein the controller is configured to maintain the center of mass of the flying machine in response to changes in payload carried by the effector;
   wherein the extendable tail is an accordion tail.

3. The flying machine of claim 1, wherein the robotic arm is operated by at least one of an on board pilot, an onboard controller, and a remote operator.

4. The flying machine of claim 1, wherein the flying machine is an Unmanned-Aircraft Vehicle System (UAVS), the UAVS further comprising:
   a radio receiver linked to the controller.

5. The flying machine of claim 4, further comprising:
a gyroscope linked to the controller.

6. The flying machine of claim 4, further comprising:
a GPS receiver linked to the controller.

7. The flying machine of claim 4, further comprising:
an accelerometer linked to the controller.

8. The flying machine of claim 1, wherein said one or more main rotor assemblies comprise a pair of counter-rotating main rotors configured to cancel angular momentum generated by each rotor of the pair of the counter-rotating main rotors.

9. The flying machine of claim 1, wherein said one or more main rotor assemblies comprise one or more ducted fan rotors.

10. The flying machine of claim 2, wherein the robotic arm is operated by at least one of an onboard pilot, an onboard controller, and a remote operator.

11. The flying machine of claim 2, wherein the flying machine is an Unmanned-Aircraft Vehicle System (UAVS), the UAVS further comprising:
a radio receiver linked to the controller.

12. The flying machine of claim 11, further comprising:
a gyroscope linked to the controller.

13. The flying machine of claim 11, further comprising:
a GPS receiver linked to the controller.

14. The flying machine of claim 11, further comprising:
an accelerometer linked to the controller.

15. The flying machine of claim 2, wherein said one or more main rotor assemblies comprise a pair of counter-rotating main rotors configured to cancel angular momentum generated by each rotor of the pair of the counter-rotating main rotors.

16. The flying machine of claim 2, wherein said one or more main rotor assemblies comprise one or more ducted fan rotors.

17. A method of flying an aircraft, the method comprising:
rotating one or more main rotors of the aircraft to generate lift;
operating a robotic arm of the aircraft, the robotic arm ending in an effector capable of carrying payloads; and
regulating length of an extendable telescoping tail of the aircraft, the extendable telescoping tail being positioned opposite side of the aircraft with respect to the robotic arm, a power pack of the aircraft being stored substantially at the end of the extendable telescoping tail, thereby maintaining center of mass of the aircraft in response to changes in payload carried by the effector.

18. The method of claim 17, further comprising:
monitoring the center of mass of the aircraft.

19. The method of claim 17, further comprising:
monitoring an angle of pitch of the aircraft.

20. A method of flying an aircraft, the method comprising:
rotating one or more main rotors of the aircraft to generate lift;
operating a robotic arm of the aircraft, the robotic arm ending in an effector capable of carrying payloads; and
regulating length of an extendable scissor-type tail of the aircraft, the extendable scissor-type tail being positioned opposite side of the aircraft with respect to the robotic arm, a power pack of the aircraft being stored substantially at the end of the extendable scissor-type tail, thereby maintaining center of mass of the aircraft in response to changes in payload carried by the effector.

21. The method of claim 20, further comprising:
monitoring the center of mass of the aircraft.

22. The method of claim 17, further comprising:
monitoring an angle of pitch of the aircraft.

* * * * *

UNITED STATES PATENT AND TRADEMARK OFFICE
CERTIFICATE OF CORRECTION

PATENT NO. : 11,794,879 B2
APPLICATION NO. : 17/515231
DATED : October 24, 2023
INVENTOR(S) : Alexander I. Poltorak It is certified that error appears in the above-identified patent and that said Letters Patent is hereby corrected as shown below:

In the Specification

Column 10, Line 19, cancel "10M." and replace with --100.--.

Signed and Sealed this
Fifth Day of December, 2023

Katherine Kelly Vidal
*Director of the United States Patent and Trademark Office*